(12) United States Patent
Lerner et al.

(10) Patent No.: US 8,317,613 B2
(45) Date of Patent: Nov. 27, 2012

(54) SOCIAL INTERACTIVE CONTENT CREATOR DEVELOPMENT

(75) Inventors: Edward Lerner, San Francisco, CA (US); Charles Nicholson, San Francisco, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 0 days.

(21) Appl. No.: 13/098,372

(22) Filed: Apr. 29, 2011

(65) Prior Publication Data

US 2012/0276993 A1 Nov. 1, 2012

(51) Int. Cl.
*G06F 17/00* (2006.01)
(52) U.S. Cl. .......................................... 463/31
(58) Field of Classification Search ............... 463/30–33
See application file for complete search history.

(56) References Cited

U.S. PATENT DOCUMENTS

| | | | |
|---|---|---|---|
| 8,032,481 B2* | 10/2011 | Pinckney et al. ............ 706/62 |
| 2006/0217199 A1 | 9/2006 | Adcox et al. |
| 2007/0178968 A1 | 8/2007 | Cote-Charpentier et al. |
| 2007/0218965 A1 | 9/2007 | Tilston et al. |
| 2007/0298886 A1 | 12/2007 | Aguilar, Jr. et al. |
| 2009/0233705 A1* | 9/2009 | LeMay et al. ............... 463/25 |
| 2010/0304825 A1* | 12/2010 | Davis et al. ................. 463/17 |
| 2010/0312724 A1* | 12/2010 | Pinckney et al. ............ 706/11 |

OTHER PUBLICATIONS

Notification of Transmittal, International Search Report and Written Opinion issued in International Application No. PCT/US2012/031725, mailed Aug. 27, 2012 (12 total pages).

\* cited by examiner

*Primary Examiner* — Ronald Laneau
(74) *Attorney, Agent, or Firm* — Martine Penilla Group, LLP

(57) ABSTRACT

A system is provided for social interactive content development of a plurality of art assets for an interactive video game. The system includes a proximity analyzer for determining proximity relationships amongst the plurality of art assets, each of the art assets being defined for display during execution of the interactive video game. An activity monitor is provided for monitoring access to the plurality of art assets. And a social inference engine is provided for initiating a communication in response to triggering a predefined access threshold set for a specific art asset based on a proximity relationship of the specific art asset to a proximate art asset.

30 Claims, 16 Drawing Sheets

US 8,317,613 B2

SOCIAL INTERACTIVE CONTENT CREATOR DEVELOPMENT

RELATED APPLICATIONS

This application is related to U.S. patent application Ser. No. 13/091,084 entitled "SOCIAL INTERACTIVE CODE DEVELOPMENT," filed Apr. 20, 2011, by inventors Edward Lerner and Charles Nicholson, the disclosure of which is herein incorporated by reference in its entirety.

BACKGROUND

1. Field of the Invention

The present invention relates to methods and systems for social interactive content creator development.

2. Description of the Related Art

As technology continues to develop, so interactive software applications such as video games continue to grow in complexity. By way of example, a typical video game may include a great number of content assets. Furthermore, individual content assets may be composed of several subsidiary content assets. In a typical development scenario, individual content assets are assigned to individual developers or editors who are responsible for developing the asset.

However, content assets are related to each other in various ways, and changes made by one developer to a given asset may affect another related content asset. Often times the cumulative effect of changes made by developers or editors in isolation will not be realized until a fairly late stage in development. For example, graphical inconsistencies may not be realized until a quality assurance tester tests the video game.

Therefore, there is a need in the art for systems and methods that enable developers and editors of content assets to develop such content assets in a socially interactive manner.

It is in this context that embodiments of the invention arise.

SUMMARY

Embodiments of the present invention provide systems and methods for social interactive content creator development. It should be appreciated that the present invention can be implemented in numerous ways, such as a process, an apparatus, a system, a device or a method on a computer readable medium. Several inventive embodiments of the present invention are described below.

In one embodiment, a system is provided for social interactive content development of a plurality of art assets for an interactive video game. The system includes a proximity analyzer for determining proximity relationships amongst the plurality of art assets, each of the art assets being defined for display during execution of the interactive video game. An activity monitor is provided for monitoring access to the plurality of art assets. And a social inference engine is provided for initiating a communication in response to triggering a predefined access threshold set for a specific art asset based on a proximity relationship of the specific art asset to a proximate art asset.

In one embodiment, at least one of the plurality of art assets defines a volumetric region in a virtual environment of the interactive video game. In another embodiment, at least one of the plurality of art assets is defined by a skeletal animation. In one embodiment, the predefined access threshold is selected from the group consisting of opening, viewing, or editing the specific art asset. In one embodiment, the communication is directed to one or more of a user triggering the predefined access threshold set for the specific content asset and a user triggering a predefined access threshold set for the proximate content asset.

In one embodiment, the communication comprises a real-time communication link, the real-time communication link defined between a user triggering the predefined access threshold set for the specific content asset and a user triggering a predefined access threshold set for the proximate content asset. In one embodiment, the real-time communication link includes one of a live view and a history view of the specific content asset or the proximate content asset.

In one embodiment, the proximity analyzer determines proximity relationships amongst the plurality of content assets by analyzing one or more of the following: relatedness of two or more of the plurality of content assets to a same object; one or more of parent, child, or peer relationships amongst two or more of the plurality of content assets; geographical proximity of two or more of the plurality of content assets when in use by the interactive application; or temporal proximity of two or more of the plurality of content assets when in use by the interactive application.

In one embodiment the system further includes a user interface having a value data presenter for presenting value data regarding one or more of the plurality of content assets, the value data defining a relative level of importance, wherein the value data includes metrics derived from one or more of development time, play time, test time, cost, and revenue.

In one embodiment, the system further includes a user interface having an overlay presenter for displaying proximate art assets overlaid upon each other.

In another embodiment of the invention, a system is provided for performing quality assurance (QA) of a plurality of content assets for an interactive application. The system includes an execution module for executing the interactive application for QA testing. A flag generator is provided for generating a flag during the execution of the interactive application, the flag identifying a QA issue, the flag defined for a location within a virtual environment rendered during the execution of the interactive application. And a social feedback engine is provided for initiating a communication to an owner of a specific content asset proximate to the flag, the specific content asset being defined within the virtual environment during the execution at a location proximate to the location of the flag, the communication identifying the flag.

In one embodiment, the flag is associated with the specific content asset. In one embodiment, the system further includes a capture module for capturing one or more of an image or video from the execution of the interactive application in which the flag is defined. In one embodiment, the flag identifies a QA tester, and the communication includes a link to initiate a real-time communication between the owner of the specific content asset and the QA tester. In one embodiment, the flag generator provides a user interface for defining attributes of the flag.

In one embodiment of the invention, a method is provided for social interactive content development of a plurality of art assets for an interactive video game. The method includes determining proximity relationships amongst the plurality of art assets, each of the art assets being defined for display during execution of the interactive video game. Access to the plurality of art assets is monitored. And a communication is initiated in response to triggering a predefined access threshold set for a specific art asset based on a proximity relationship of the specific art asset to a proximate art asset.

In one embodiment of the method, at least one of the plurality of art assets defines a volumetric region in a virtual environment of the interactive video game. In another embodiment, at least one of the plurality of art assets is defined by a skeletal animation. In one embodiment, the predefined access threshold is selected from the group consisting of opening, viewing, or editing the specific art asset. In one embodiment, the communication is directed to one or more of a user triggering the predefined access threshold set for the specific content asset and a user triggering a predefined access threshold set for the proximate content asset.

In one embodiment, the communication comprises a real-time communication link, the real-time communication link defined between a user triggering the predefined access threshold set for the specific content asset and a user triggering a predefined access threshold set for the proximate content asset. In one embodiment, the real-time communication link includes one of a live view and a history view of the specific content asset or the proximate content asset.

In one embodiment, determining proximity relationships amongst the plurality of content assets includes analyzing one or more of the following: relatedness of two or more of the plurality of content assets to a same object; one or more of parent, child, or peer relationships amongst two or more of the plurality of content assets; geographical proximity of two or more of the plurality of content assets when in use by the interactive application; or temporal proximity of two or more of the plurality of content assets when in use by the interactive application.

In one embodiment, the method further includes presenting value data regarding one or more of the plurality of content assets, the value data defining a relative level of importance, wherein the value data includes metrics derived from one or more of development time, play time, test time, cost, and revenue. In one embodiment, the method includes displaying proximate art assets overlaid upon each other.

In another embodiment of the invention, a method is provided for performing quality assurance (QA) of a plurality of content assets for an interactive application. The method initiates with executing the interactive application for QA testing. A flag is generated during the execution of the interactive application, the flag identifying a QA issue, the flag defined for a location within a virtual environment rendered during the execution of the interactive application. And a communication is initiated to an owner of a specific content asset proximate to the flag, the specific content asset being defined within the virtual environment during the execution at a location proximate to the location of the flag, the communication identifying the flag.

In one embodiment of the method, the flag is associated with the specific content asset. In one embodiment, the method further includes capturing one or more of an image or video from the execution of the interactive application in which the flag is defined. In one embodiment, the flag identifies a QA tester, and wherein the communication includes a link to initiate a real-time communication between the owner of the specific content asset and the QA tester. In one embodiment, generating the flag generator includes providing a user interface for defining attributes of the flag.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods and apparatus for social interactive code development.

It will be obvious, however, to one skilled in the art, that the present invention may be practiced without some or all of these specific details. In other instances, well known process operations have not been described in detail in order not to unnecessarily obscure the present invention.

Figure 1:
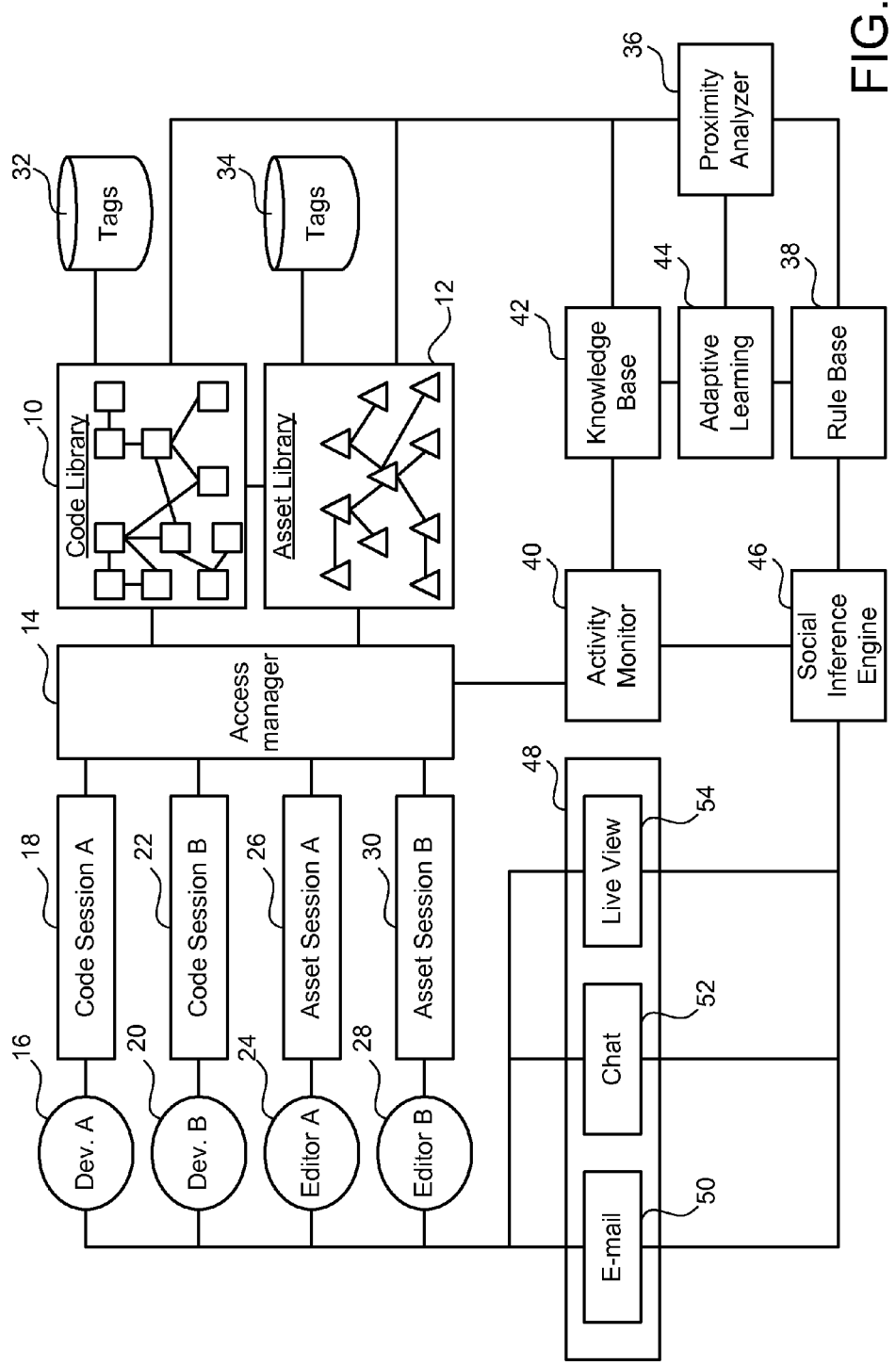
FIG. 1 illustrates a system for social interactive content development, in accordance with an embodiment of the invention.

FIG. 1 illustrates a system for social interactive content development, in accordance with an embodiment of the invention. A code library 10 includes various code modules for the interactive application. According to one embodiment, in order to execute the interactive application, the code modules of the code library 10 are compiled and executed. By way of example, in one embodiment the interactive application is a videogame and the code modules in the code library 10 define the video game's game engine. An asset library 12 contains various content assets for the interactive application. A content asset will be understood by those skilled in the art as any type of content used for the interactive application. For example, content assets can include any of various types of graphically related items, such as graphical objects, wire frame structures, three-dimensional objects, textures, animations, etc. content assets can also include various types of audio items, such as sound effects, sound clips, songs, etc.

An access manager 14 manages access to the code modules of the code library 10 in the content assets of the asset library 12. The access manager 14 provides for various development or editing sessions for the development and editing of the code modules and content assets. For purposes of this disclosure, a developer will generally be understood as a person responsible for developing or editing one or more code modules whereas an editor will generally be understood as a person responsible for developing or editing one or more content assets. However, the terms may also be used interchangeably. As shown in the illustrated embodiment, a developer 16 develops one or more code modules via a code session 18; a developer 20 develops one or more code modules via a code session 22. Whereas, an editor 24 edits one or more content assets via an asset session 26; and an editor 28 edits one or more assets via an asset session 30.

A tags module 32 contains various tags that are associated with one or more of the code modules in the code library 10. Tags will be understood by those skilled in the art with reference to related U.S. patent application Ser. No. 13/091,084 entitled "SOCIAL INTERACTIVE CODE DEVELOPMENT," filed Apr. 20, 2011, by inventors Edward Lerner and Charles Nicholson, which describes various tags and their functionality. In a similar manner, a tags module 34 contains various tags which are associated with one or more of the content assets of the asset library 12.

A proximity analyzer 36 analyzes proximity relationships amongst the code modules of the code library 10 in the content assets of the asset library 12. Various examples of proximity relationships are described elsewhere herein. Merely by way of example, proximity relationships may be defined based on various criteria such as parent-child relationships, peer relationships, geometric proximity, temporal proximity, etc.

The proximity analyzer 36 analyzes the code modules of the code library 10 and the content assets of the asset library 12 based on rules for determining proximity contained in a rule base 38. In one embodiment, the rules for determining proximity are manually determined and entered into the rule base 38. As the proximity analyzer 36 determines proximity relationships among the code modules and content assets, these determined relationships may serve to define additional rules that are stored in rule base 38.

For example, in one embodiment a rule for determining proximity defines content assets that are related in a parent-child relationship as being proximate assets. Based on this rule, the proximity analyzer 36 analyzes the content assets of the asset library 12 and determines those content assets which have a parent-child relationship to be proximate to each other. These determinations regarding proximity can be stored as additional rules in the rule base 38. It will be apparent to those skilled in the art that other embodiments the rules for determining proximity which may be utilized by the proximity analyzer 36 to analyze code modules and content assets can define proximity based on any of various properties of the content assets or code modules or any of various types of relationships amongst them.

An activity monitor 40 monitors access activity to the code modules of the code library 10 and the content assets of the asset library 12. Historical access activity data is stored in a knowledge base 42. The proximity analyzer 36 may also analyze data in the knowledge base 42 to determine proximity of various code modules or content assets. For example, in one embodiment a rule for determining proximity may define proximity based on concurrent access by users. In other words, code modules or content assets that tend to be accessed concurrently may be determined to be proximate to each other. Based on such a rule, the proximity analyzer 36 analyzes the historical access data of the knowledge base 42 to determine those content assets or code modules which tend to be accessed concurrently, and determines these code modules or content assets to be proximate to each other.

It will be apparent to those skilled in the art that in various embodiments the level of specificity with which the activity monitor 40 monitors access activity to the code modules or content assets may vary. In one embodiment, the activity monitor 40 is configured to detect and monitor who is accessing what content asset or code module. In other embodiments, the activity monitor 40 is also configured to monitor other types of access activity, such as the specific changes being made to a code module or content asset by a specific user. Similarly, rules for determining proximity based on analysis of historical access data in the knowledge base 42 can vary in scope. As noted above, a rule for determining proximity may define proximity based on concurrent access. In other embodiments, such a rule may define proximity based on various other types of detected access activity, such as the types of edits or changes being made to code modules or content assets.

A social inference engine 46 is configured to initiate a communication based on access activity detected by the activity monitor 40 and a rule of the rule base 38. The communication is effected by a communications module 48. In various embodiments, the communications module 48 can be configured to support various types of communication such as e-mail 50, chat 52, or live view 54. It will be noted by those skilled in the art that in other embodiments communications module 48 may be configured to support any of various other types of communication such as voice or video communications, text messaging, etc.

Merely by way of example, in one embodiment a rule may specify that when two or more different users are simultaneously accessing proximate content assets, a communication should be initiated to the two different users to inform them that they are working on related content assets. Thus, when the social inference engine 46 determines that such a situation exists based on data received from activity monitor 40, the social inference engine 46 initiates a communication to the users. For example, in one embodiment, the editor 24 and editor 28 are working on proximate content assets via their respective asset sessions 26 and 30. The activity monitor 40 monitors their activity, and the social inference engine 46 initiates a communication to the editors 24 and 28 informing them that they are working on proximate content assets. The communication may include options for further communication, such as providing options for initiating a chat session or providing a live view of each other's current editing window.

It will be understood by those skilled in the art that in various embodiments of the invention, rules for initiating communication based on access activity and proximate content assets or code modules may vary to a great extent. As noted above, a rule may specify that a communication be initiated when two or more users are simultaneously accessing proximate content assets or code modules. In another example, a rule may be defined such that when a given user accesses a particular content asset, and an owner of a proximate asset to the particular content asset is not online or otherwise available for real-time communication, then an e-mail or other type of non-real time communication is sent to the owner of the proximate asset. The e-mail could be sent to the owner of the proximate asset after the given user has finished editing the particular content asset, informing the owner of the proximate asset of the types of changes which were made to the particular content asset. Additionally, the rule may specify that a message be sent to the given user alerting the user to the existence of the proximate asset and how changes made to the particular content asset may affect the proximate content asset.

In still another embodiment, a rule may specify that when a user accesses a given content asset, the user is informed of editing activity performed on proximate content assets or proximate code modules since the previous time the given content asset was accessed, as such editing activity may affect the given content asset. Or in other embodiments, rules may specify that communication be initiated in response to only particular types of editing activity performed on proximate content assets or code modules so that not all types of editing activity trigger the initiation of a communication. In still other embodiments, rules may specify communication be initiated in response to any of various types of access or editing activity related to proximate content assets or code modules.

Though the foregoing examples of rules defining communication in response to access activity have generally been applied to the editing activity of various content assets, the same concepts may be readily extended to code modules as well, as code modules may be proximate to other code modules and as content assets and code modules may be proximate to each other. In one embodiment, a rule may define a communication to be initiated based on triggering an access activity to a code module that is proximate to another code module. Or in another embodiment, a rule may define a communication to be initiated based on detected access activity to either a code module or a content asset that are proximate to each other.

In some embodiments, a single code module may be proximate to multiple content assets. Various rules may define with specificity communications based on detection of particular types of access activity to the code module and the manner in which the access activity may affect one or more content assets. For example, a particular access activity to one portion of the code module, such as editing that portion of the code module, may only affect one content asset, while not affecting other content assets which are also proximate or related to the code module in some way. Thus, a rule may specify that editing of that portion of the code module will trigger a communication directed only to an owner of the affected content asset, but not to any other owners of content assets which are also proximate to the code module. It will be apparent to those skilled in the art that in other embodiments, rules may define various triggering events relating to access activity of a code module for which a communication will be initiated to an owner of a proximate content asset. For example, a rule may define an initiation of communication to an owner of a content asset when a new reference to or use of the content asset is inserted in a code module. The communication may inform the owner of the content asset of the insertion of the reference, and any other information which may be useful for the owner, such as the particular nature of the insertion, the names of other content assets which are referenced by the same code module or portion thereof, a screenshot illustrating how the content asset is rendered and in what context when the code module or relevant portion is in use or activated, etc.

In one embodiment, the system includes an adaptive learning module 44 which implements a machine learning method to adjust the rulebase 38 and develop new rules concerning proximity and social feedback. Various types of machine learning methods may be implemented such as neural networks, genetic programming, Bayesian networks, etc. In one embodiment, the adaptive learning module 44 optimizes the proximity rules of the rulebase 38 so that the proximity rules are better able to determine actual proximate content assets and code modules.

Figure 2:
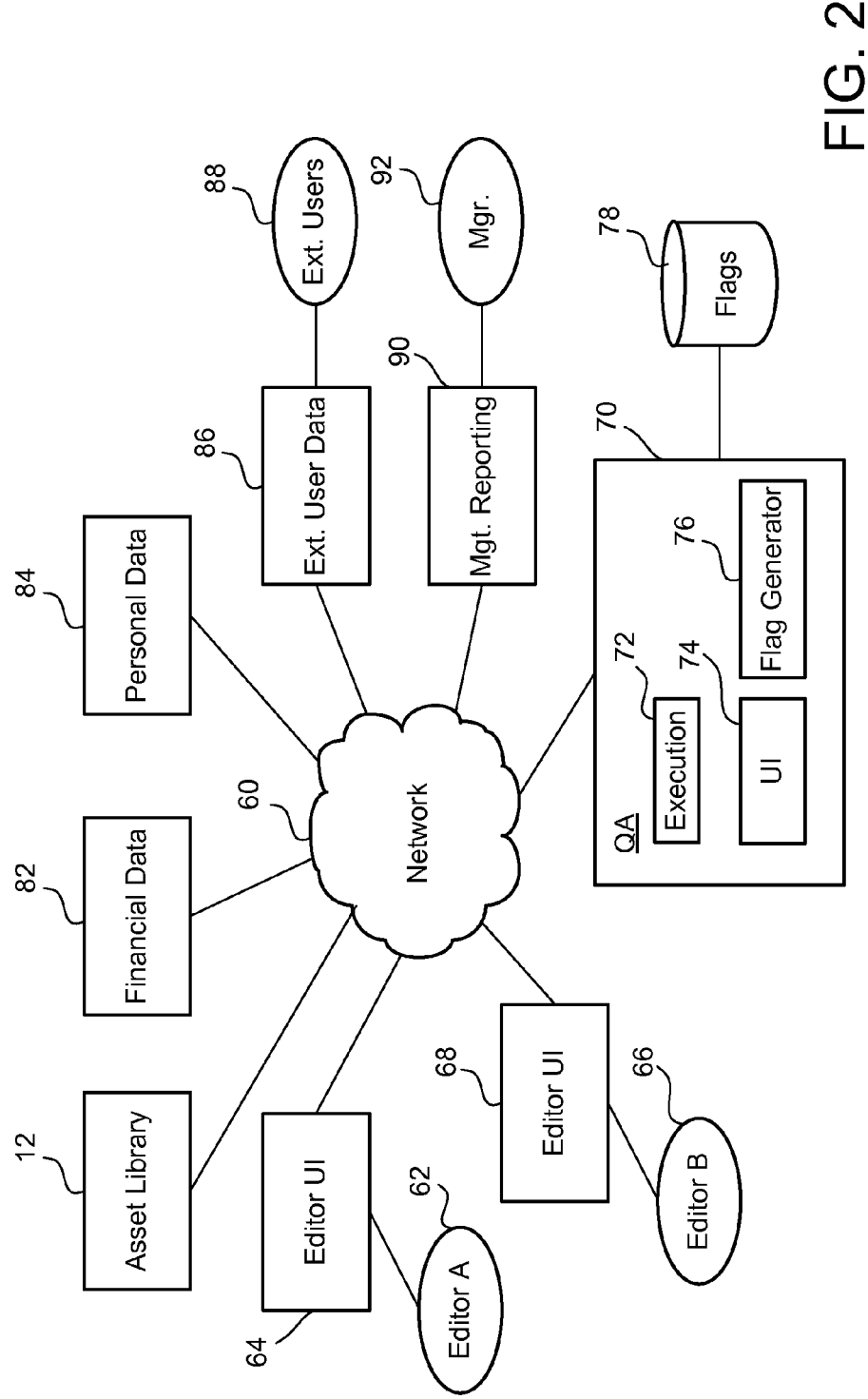
FIG. 2 illustrates a system for development of content assets for an interactive application, in accordance with an embodiment of the invention.

FIG. 2 illustrates a system for development of content assets for an interactive application, in accordance with an embodiment of the invention. As shown, various portions of the system are linked to each other via a network 60. Network 60 may be any type of wired or wireless network, such a LAN, WAN, the Internet, etc. An asset library 12 contains various content assets. In the illustrated embodiment, an editor 62 is creating or editing one or more content assets via an editor user interface (UI) 64; and another editor 66 is working on one or more content assets via an editor UI 68.

A quality assurance (QA) module 70 is provided for enabling a QA tester 80 to perform quality assurance of the interactive application. The QA module 70 includes an execution module 72 for executing the interactive application for testing purposes. The QA module 74 further includes a QA-specific UI 74 which includes an option to set one or more flags during the course of execution of the interactive application. To set a flag, the UI 74 activates a flag generator 76 that enables setting of the parameters of the flag. Flags are stored in a flag storage 78.

A QA flag will generally be understood as an item which describes a bug or problem with the interactive application that needs to be addressed. A flag can be defined at a spatial location and/or a temporal location at which the flag is set. Furthermore, a flag can be associated with a specific content asset within the spatial environment of the interactive application. A flag can include various other parameters such as information pertaining to the type of QA issue which is denoted by the flag or specific details such as the name or id of the QA tester who sets the flag and notes made by that QA tester. In one embodiment, a representation of the flag can be displayed within the spatial environment (such as a two-dimensional or three-dimensional virtual environment) of the interactive application.

For example, in one embodiment wherein the interactive application is a video game, the QA tester 80 plays the video game and interacts with the virtual environment of the video game. When the QA tester 80 notices a bug in the video game, the QA tester 80 utilizes the UI 74 to set a flag for the bug. The flag may be defined for a specific location within a particular spatial environment of the game, and displayed as a visual flag in the spatial environment. The flag may also be associated with a particular content asset within the spatial environment. Additionally, the QA tester 80 can indicate various parameters for the flag, such as descriptive information about the nature of the issue being reported.

If the flag is associated with a particular content asset, then the setting of the flag may trigger the sending of a notification to the owner of the particular content asset, so as to inform the owner of the flag and the existence of a quality assurance issue pertaining to the content asset. In another embodiment, the flag is defined for a location with the spatial environment of the video game, but is not specifically associated with a particular content asset. However, the system can be configured to automatically detect content assets which are nearby or proximate to the location of the flag, and send notifications to owners of those content assets regarding the QA flag. Such a configuration can be notably useful where a QA issue pertains to multiple content assets and their interactions with each other. The notifications can include information about the flag as well as other content assets and the corresponding owners who have been notified, so as to facilitate coordination amongst the owners of the content assets that are called to issue by the QA flag.

In one embodiment, a screenshot or video clip showing the QA flag in the spatial environment of the video game can be saved and associated with the flag. A notification sent to an owner of a relevant content asset may include a reference to or link enabling the owner to view the screenshot or video clip to better understand the context of the QA issue.

As noted above, QA flags can be represented visually in the spatial environment of the video game. In this manner, a user playing through the video game is able to see the flags as they play the video game. For example, a QA tester can see flags which have been set by other QA testers during earlier sessions of the video game. In this manner, a QA tester can readily ascertain visually whether or not a flag as already been set for a particular issue relating to a particular location or content asset in the interactive application. Also, a reviewing editor or developer can play through the video game and see a flag in its native context during the course of game play. In one embodiment, a notification sent to an owner of a content asset regarding a QA issue includes a link to enable the owner to play through the video game at a spatial and temporal location within the game at which the flag is located.

With continued reference to FIG. 2, various other modules are shown connected to network 60. For example, a financial data module 82 provides financial data relating to the interactive application, such as various costs for the interactive application and revenue generated by the interactive application. Also, a personnel data module 84 provides data regarding personnel who work on the interactive application, such as salary information, experience level, etc. The data from the financial data module 82 and personnel data module 84 can be analyzed in conjunction with various content assets to provide additional functionality. For example, in one embodiment, the data are analyzed in order to generate an estimated cost for a given content asset, and an estimated amount of revenue generated by the content asset. In one embodiment, wherein editor 62 is working on the content asset, the cost and revenue estimates can be provided to editor 62 via the editor UI 64. In this manner, the editor 62 can gain a sense of how his or her work on the content asset may affect both costs and revenue which are associated with the content asset.

Additionally, such information may be of interest to managers who are responsible for evaluating projects and personnel and determining how to allocate resources and determine priorities for development of the interactive application. Thus, in one embodiment, a management reporting interface 90 is provided for enabling a manager 92 to generate reports regarding the interactive application. For example, a report may include the aforementioned estimates of cost and revenue on a per asset basis. Managers may utilize such reports to compare the cost-effectiveness of various content assets, and gain insight regarding how to efficiently deploy resources. For example, it may be discovered that certain assets have low cost but generate comparatively high amounts of revenue. Such results may merit further inquiry to discover why these content assets exhibit such efficient performance. Conversely, other assets may be found to have a relatively high cost but generate a relatively low amount of revenue. It can be useful to also study these content assets to determine how to improve their revenue vs. cost figures.

In other embodiments, management reports may contain information pertaining to personnel, so as to aid managers in evaluating employees and making decisions about how to prioritize their activities. For example, salary data can be analyzed along with the estimated revenue of content assets and individual employees' contributions to those assets, to determine an estimate of revenue generated as a function of cost on a per employee basis. Managers may thus gain a sense of how efficiently employees are performing or being deployed. In another embodiment, a report may be generated which details the performance of various experience levels of employees. A manager might thus be able to evaluate the benefit of experience in relation to particular types of tasks or content assets, and determine whether training would be advisable for employees at a lower experience level.

Figure 3:
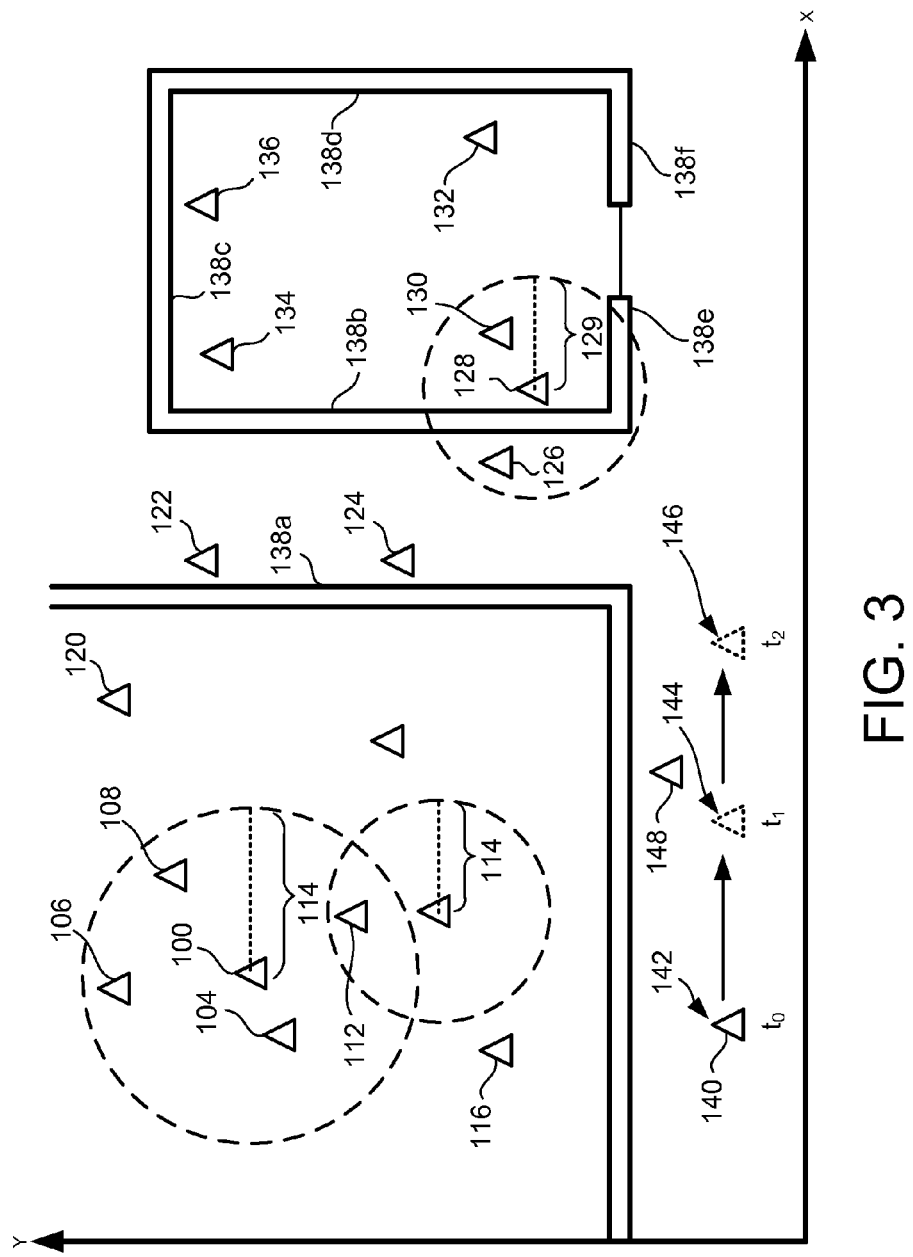
FIG. 3 illustrates various objects in a spatial environment of an interactive application, in accordance with an embodiment of the invention.

FIG. 3 illustrates various objects in a spatial environment of an interactive application, in accordance with an embodiment of the invention. The spatial environment shown as a two-dimensional environment for ease of explanation. However, it will be understood by those skilled in the art that similar principles may be readily applied to one-dimensional and three-dimensional environments. Furthermore, in one embodiment, the two-dimensional environment shown in the illustrated embodiment is representative of objects in a three-dimensional environment. In one embodiment, proximity may be defined with reference to a predefined radius, such that two objects are considered proximate if the distance between them is less than the predefined radius. For example, for a given object 100, objects within a radius 102 are considered proximate to the object 100. As shown, object 104, 106, 108, and 110 fall within a radius 102 from the object 100, and are therefore proximate to object 100. The predefined radius may vary in length according to the type of object or other considerations. For example, another object 112 has a smaller predefined radius 114 for determining proximity than the radius 102 of object 100. The object 110 lies within the predefined radius 114 and is thus considered proximate to object 112. Object 110 is thus proximate to both object 100 and object 112. Objects 116, 118, and 120 are situated further from object 100 than predefined radius 102, and are also situated further from object 112 than predefined radius 114. Therefore, objects 116 are not considered proximate to either object 100 or object 112.

In one embodiment, proximity of objects may be defined with reference to certain boundaries. For example, objects 122, 124, and 126 may be determined to be proximate to each other because they are located in a hallway structure defined by walls 138*a* and 138*b*. Or in another example, objects 128, 130, 132, 134, and 136 may be determined to be proximate to each other because they are located in a room defined by walls 138*b*, 138*c*, 138*d*, 138*e*, and 138*f*.

The foregoing concepts defining proximity can be combined in various ways. For example, in one embodiment, proximity is defined by a radius in combination with boundaries. As shown at FIG. 3, object 128 has a predefined radius 129 which determines a region in which proximate objects may be found. However, objects which are situated across a boundary will not be deemed to be proximate to the object 128. Thus, objects 126 and 130 are both located at a distance from object 128 that is within radius 129. However, only object 130 is determined to be proximate from object 128, as object 126 is located on the opposite side of boundary wall 138*b*.

In other embodiments, proximity can be time-dependent or progress-dependent. For example, an object 140 is situated at a position 142 at a time $t_0$. However, at time $t_1$ object 140 moves to position 144, at which point the object 140 is proximate to object 148, as it is geographically closer to object 148. However, at time $t_2$ the object 140 has moved to position 146, and is now no longer proximate to object 148. The foregoing is merely one example of a time-dependent proximity relationship. It will be understood by those skilled in the art that in other embodiments, proximity may vary over time or vary according to progress in various ways. In one embodiment wherein the interactive application is a video game, proximity may be defined differently for different stages of the game. For example, a certain level or stage of the game may take place in a very open environment having very few boundaries and therefore have proximity defined according to distance. Whereas another level or stage of the game may take place in an environment having many boundaries, such as a building or other compartmentalized structure, and have proximity defined according to the boundaries.

Figure 4:
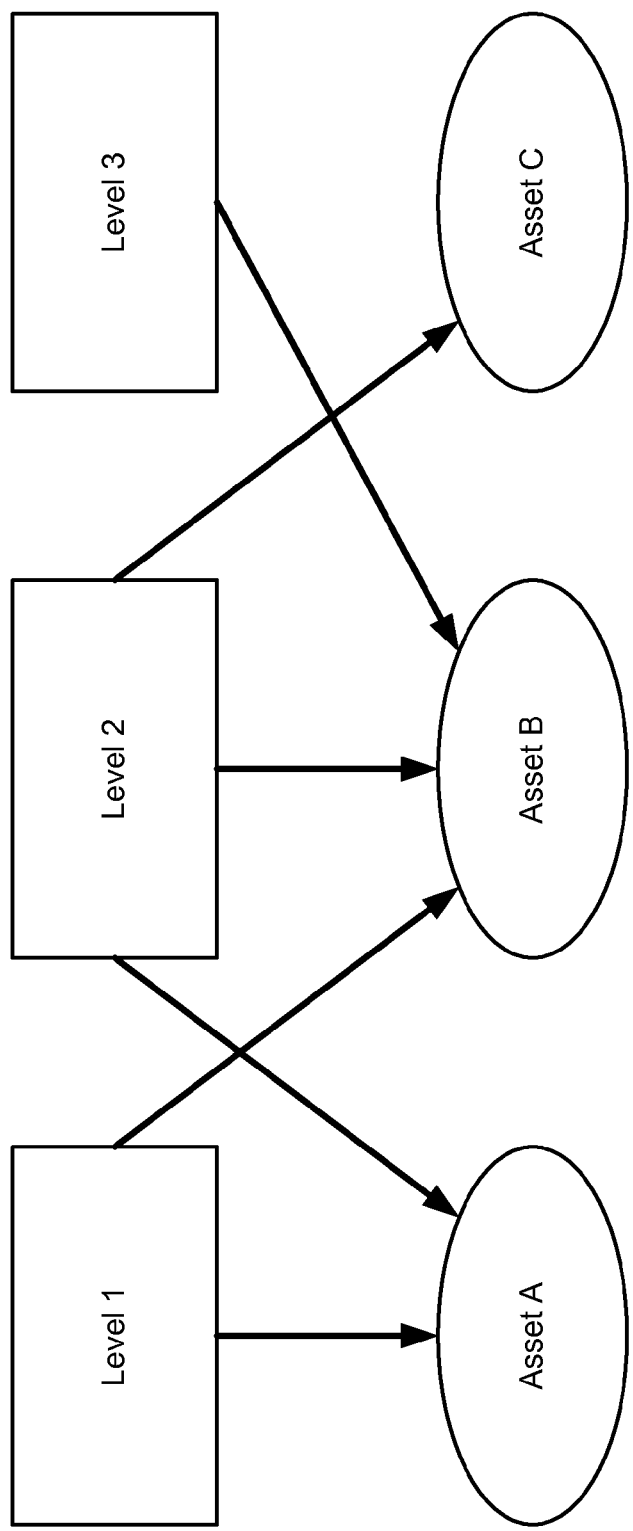
FIG. 4 illustrates various assets which are defined for various levels of a video game, in accordance with an embodiment of the invention.

FIG. 4 illustrates various assets which are defined for various levels of a video game, in accordance with an embodiment of the invention. As shown, a Level 1 of the video game references Asset A and Asset B. Level 2 of the video game references Asset A, Asset B, and Asset C. And Level 3 of the video game references Asset B only. As can be seen, a given asset can be utilized in several different contexts, such as in the case of Asset B which is utilized by all of the Levels 1-3. In contrast, Asset C is only utilized for Level 2. In accordance with embodiments of the invention described herein, editors can be made aware of such information so as to aid them in understanding the potential impact of changes made to a given asset. Editors may consider the potential ramifications across different levels or seek to collaborate with others before editing an asset that appears throughout many levels of the game. Also, managers can be made aware of such information through various reports, and evaluate the cost-effectiveness of assets. For example, if relatively large amounts of resources are being spent on an asset that appears in only limited measure, then the manager may shift resources originally allocated to that asset to other items.

Additionally, it will be noted that determinations of proximity amongst assets can be partially or wholly based on being referenced by a common level. For example, as shown at FIG. 4, Asset A and Asset B may be determined to be proximate to each other because they are both referenced by Level 1.

Figure 5:
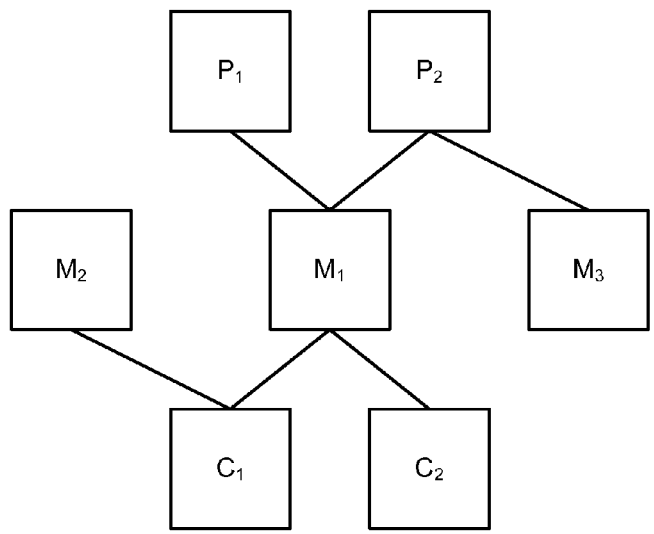
FIG. 5 illustrates parent-child relationships amongst a plurality of content assets, in accordance with an embodiment of the invention.

FIG. 5 illustrates parent-child relationships amongst a plurality of content assets, in accordance with an embodiment of the invention. As discussed elsewhere herein, proximity between content assets can be based on various factors such as parent-child relationships. As shown in the illustrated embodiment, a content asset $M_1$ may be considered proximate to content assets $P_1$ and $P_2$, which are both parents of $M_1$. Content asset $M_1$ may also be proximate to content asset $M_3$, as content assets $M_1$ and $M_3$ are both children of content asset $P_2$. Content asset $M_1$ may also be considered proximate to content assets $C_1$ and $C_2$, as $C_1$ and $C_2$ are children of $M_1$. Also, content asset $M_1$ may be considered proximate to $M_2$, as content asset $C_1$ is a child of both content assets $M_1$ and $M_2$.

Figure 6:
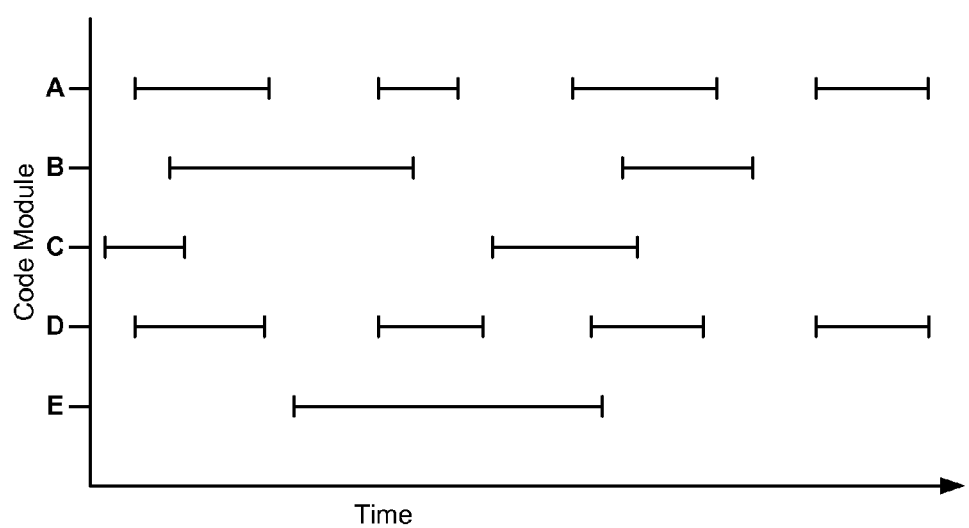
FIG. 6 illustrates periods of utilization for various content assets over time, in accordance with an embodiment of the invention.

FIG. 6 illustrates periods of utilization for various content assets over time, in accordance with an embodiment of the invention. Periods of utilization are illustrated as line segments for each of content assets A, B, C, D, and E. As shown, the periods of utilization for content assets A, B, C, and E generally do not bear any relation to one another. However, the periods of utilization for content assets A and D are fairly similar. From this it may be concluded that content assets A and D can be considered proximate to one another, as they tend to be utilized during the same time periods.

Figure 7A:
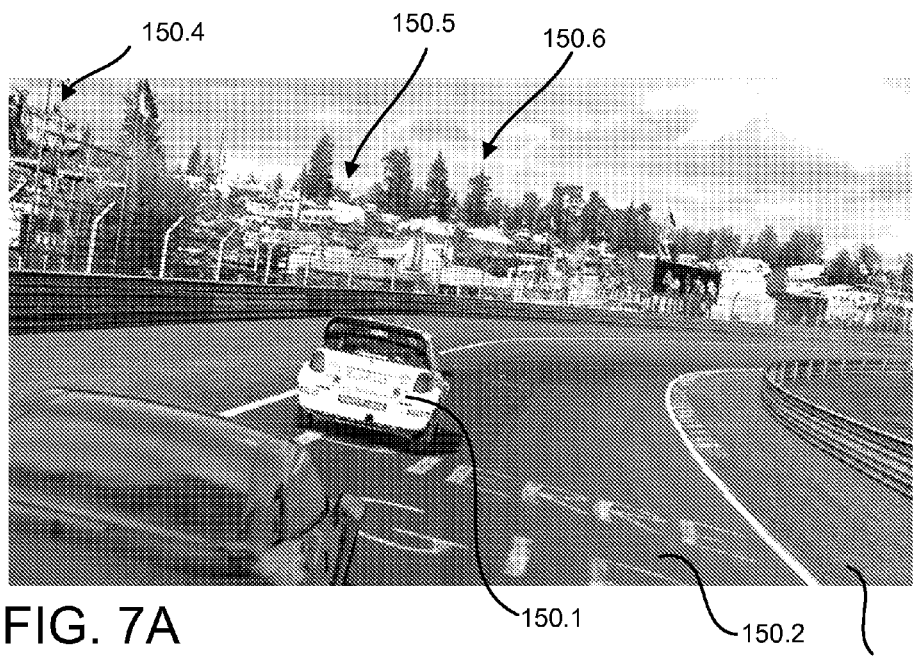
FIGS. 7A-7K illustrate scenes from various video games, showing various content assets, in accordance with embodiments of the invention.

FIG. 7A is a screenshot from a video game showing various content assets, in accordance with an embodiment of the invention. A video game may include many different kinds of content assets that may be determined to be proximate to each other. For example, in the illustrated embodiment, there is a vehicle 150.1. The vehicle 150.1 is a content asset that in turn may consist of multiple subsidiary content assets. For example, the vehicle 150.1 may consist of a wireframe structure onto which textures and shading are added. These various components of the vehicle 150.1 are proximate to each other as they pertain to the same content asset. Additionally, the vehicle 150.1 interacts with the road 150.2 and may interact with grass 150.3, and may thus be determined to be proximate to these content assets.

There may be other types of content assets, such as persons 150.4, buildings 150.5, and trees 150.6. Each of these assets are shown in a background portion of the video game, and may thus be determined to be proximate to each other because they appear in a same portion of the video game.

Figure 7B:
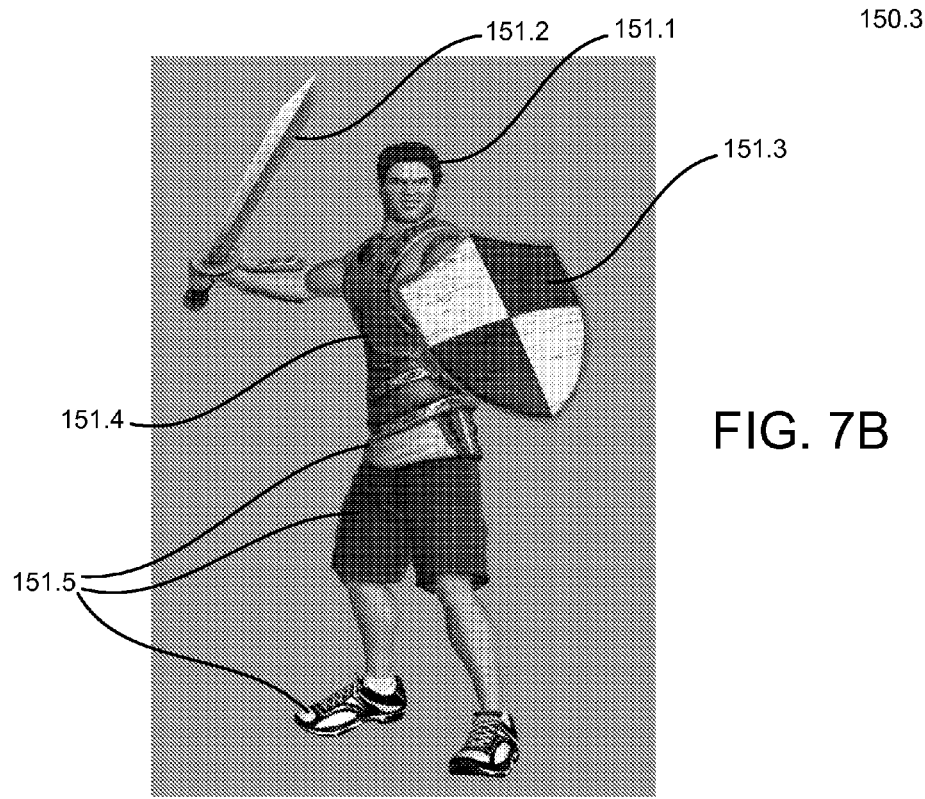

FIG. 7B illustrates a character from a video game showing various content assets, in accordance with an embodiment of the invention. As shown, a gladiator 151.1 holds a sword 151.2 and a shield 151.3. Furthermore, the gladiator 151.1 wears a chest plate 151.4 as well as various clothes 151.5. Some or all of these content assets may be determined to be proximate to each other as they relate to the same gladiator character. By way of example, in one embodiment, it is important for the sword 151.2 and shield 151.3 to be appropriate to the gladiator 151.1, and for the chest plate 151.4 to fit the gladiator 151.1 appropriately. As each of these items may be developed by a different editor, it is desirable for the various editors to develop the items in a socially aware manner. Thus, systems described herein can be configured to determine the proximity of these items and inform their corresponding editors and facilitate initiation of communication between them. Systems in accordance with embodiments described herein can also provide tools for enabling editors to develop individual assets in view of proximate assets, such as by providing overlaid views of proximate assets in their appropriate relationship to each other.

Figure 7C:
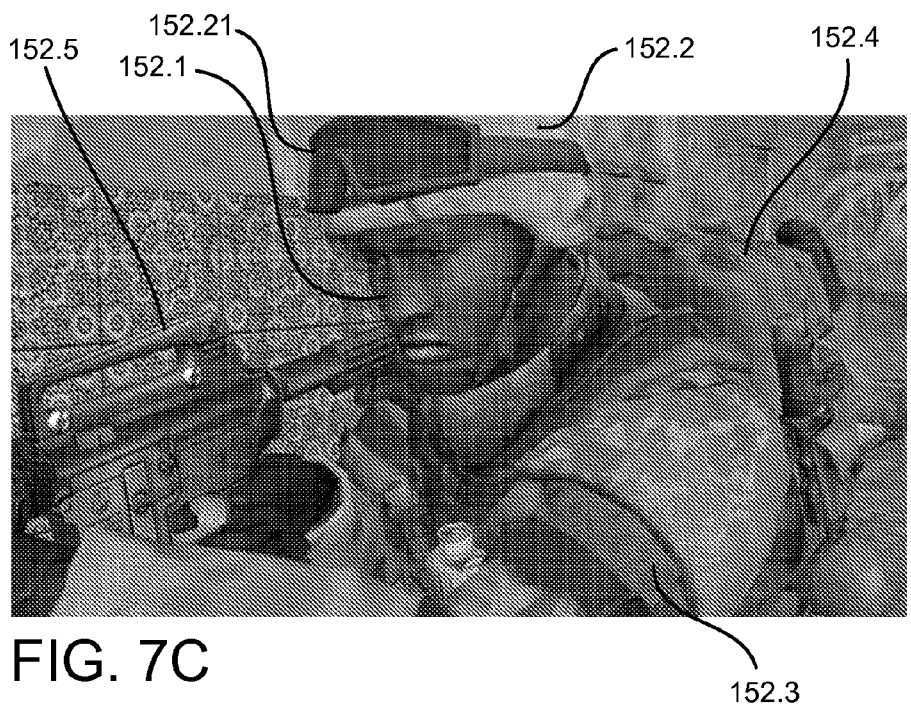

FIG. 7C illustrates a character from a video game showing various content assets, in accordance with an embodiment of the invention. As shown, a soldier 152.1 wears various items such as helmet 152.2, goggles 152.21, and jacket 152.3, and carries a pack 152.4 and gun 152.5. Some or all of these content assets may be considered proximate to each other as they relate to the same soldier character. For example, it is important that articles of clothing such as helmet 152.2, goggles 152.21, and jacket 152.3 fit the soldier 152.1. Systems in accordance with embodiments of the present invention can detect the proximity of these items, and promote social interactive development of them through initiation of communication between various owners based on the proximity relationships of the items.

Figure 7D:
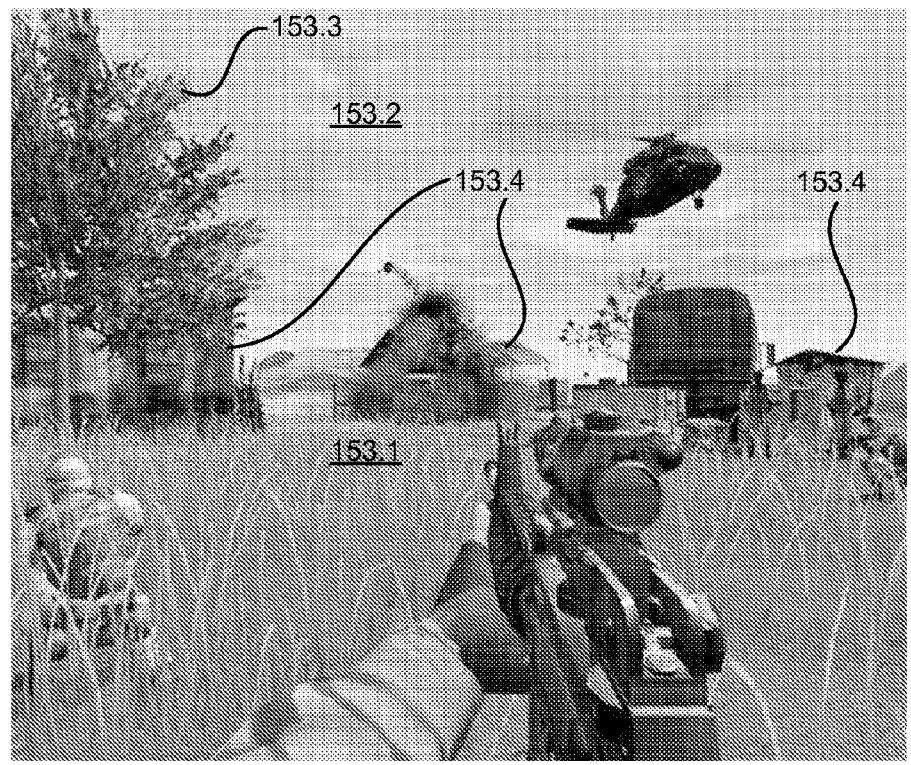

FIG. 7D illustrates a scene from a first-person shooter video game, in accordance with an embodiment of the invention. As shown, the battle takes place in an environment including natural elements such as grass 153.1, the sky 153.2, and trees 153.3. Each of these elements may be a content asset, and may include subsidiary content assets. For example, the grass 153.1 may include various patches of grass or even individual blades of grass, and the sky 153.2 may include different types of clouds. Subsidiary content assets can be determined to be proximate to each other based on their relationship to the same larger content asset. And the aforementioned natural elements can be determined to be proximate to each other because they relate to the same scene of the video game. Furthermore, there may be other content assets in the same environment of the video game, such as buildings 153.4, which may be proximate to the aforementioned natural elements.

Figure 7E:
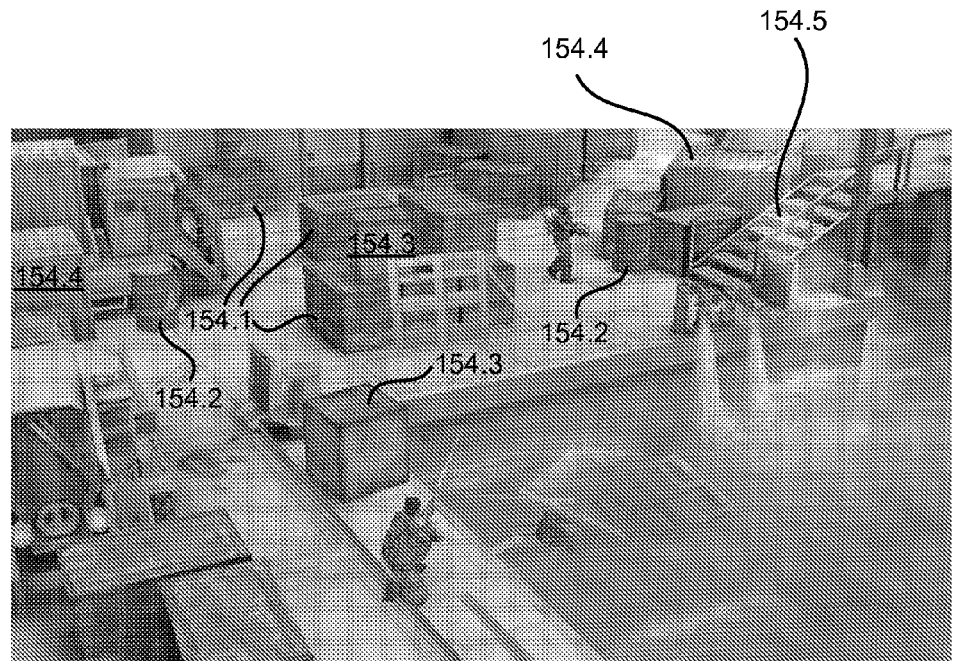

FIG. 7E illustrates an environment of a video game, in accordance with an embodiment of the invention. Certain content assets or props can be utilized repeatedly within a video game environment. For example, boxes 154.1 and 154.3, containers 154.4, and barrels 154.2 are placed throughout the illustrated environment. These and other props or items must be compatible with each other when placed in the game environment. They must also be compatible with other features of the environment, such as stairs 154.5. Because props may be utilized repeatedly in a game environment, even minor changes to a single prop can have a large impact. Thus, it is important for an artist or editor working on a prop to understand the context in which the prop will be placed and the way it fits alongside other props and features of the game environment. Systems in accordance with embodiments of the invention can determine which props are proximate to each other, such by analyzing placement maps which define the placement of props in the game environment, and facilitate communication between editors or artists working on proximate props. Furthermore, systems can inform editors or artists of the relative importance of various props based on their frequency of use.

Figure 7F:
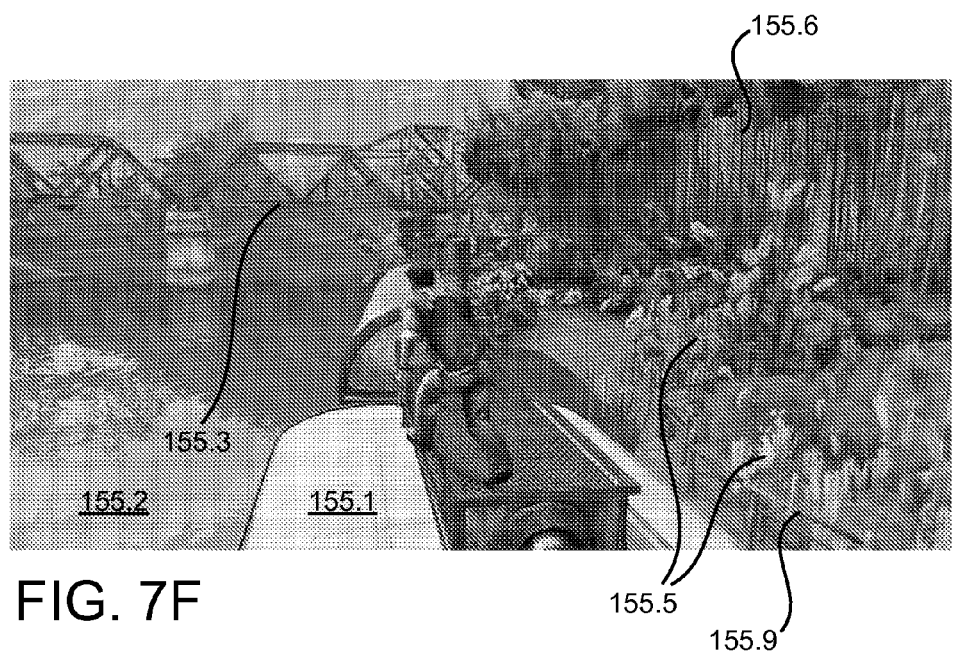

FIG. 7F illustrates a scene from a video game, in accordance with an embodiment of the invention. The scene includes various content assets, such as train 155.1, water 155.2, bridge 155.3, fence 155.4, plants 155.5, and trees 155.6. These assets may be determined to be proximate to each other based on their appearance in the same scene of the video game. For example, it is important for the bridge 155.3 to have an appropriate clearance for the train 155.1 to pass underneath it. Systems in accordance with embodiments of the invention can be configured to inform the bridge artist of the proximity relationship between the train 155.1 and bridge 155.3. In one embodiment, the bridge artist can edit the bridge 155.3 in an editor with the train 155.1 placed as it would appear in the actual game, so that the bridge artist can assess whether the bridge 155.3 has an appropriate clearance for the train 155.1. In another example, various landscape features, such as fence 155.4, plants 155.5, and trees 155.6 should match each other so as to create a coherent scene. Systems in accordance with embodiments of the invention can be configure to enable artists responsible for such landscape features to view them alongside or overlaid with other proximate assets.

Figure 7G:
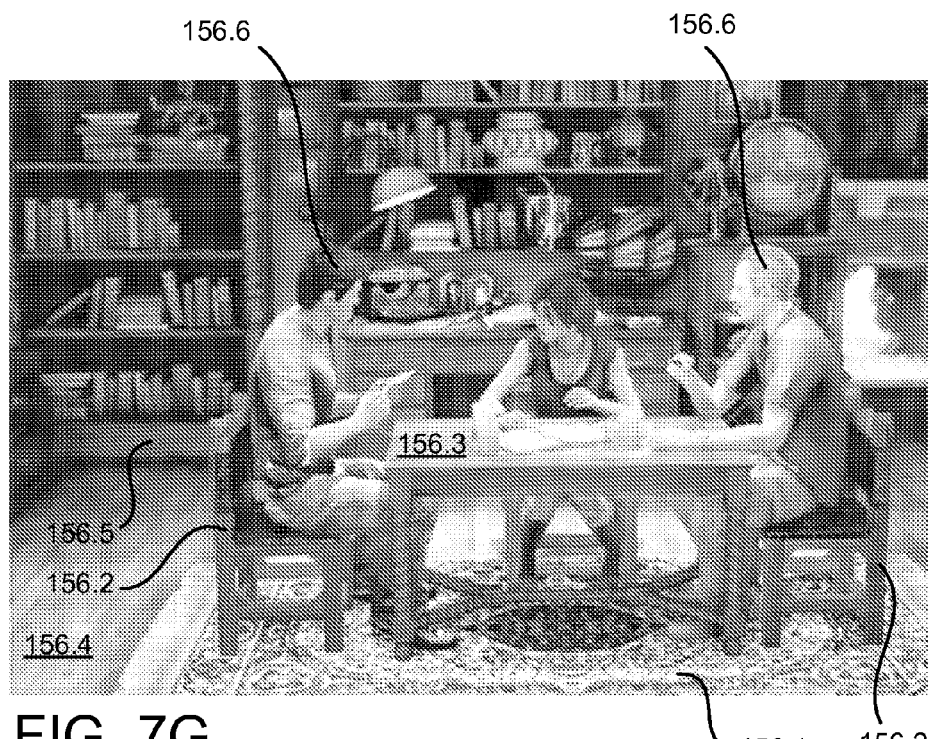

FIG. 7G illustrates a scene from a video game, in accordance with an embodiment of the invention. In the illustrated scene, carpet 156.1, chairs 156.2, table 156.3, floor 156.4, bookshelf 156.5, and characters 156.6 may be determined to be proximate to each other, as they appear grouped together in the scene. For example, it may be important that the furniture be of a certain style to fit the overall style of the room. It may also be important that the chairs 156.2 and table 156.3 be configured to allow the characters 156.6 to sit on the chairs 156.2 with their knees fitting underneath the table 156.3. Systems in accordance with embodiments of the invention can be configured to enable artists or editors responsible for the development of these assets to understand their proximate relationship to each other during the development process.

Figure 7H:
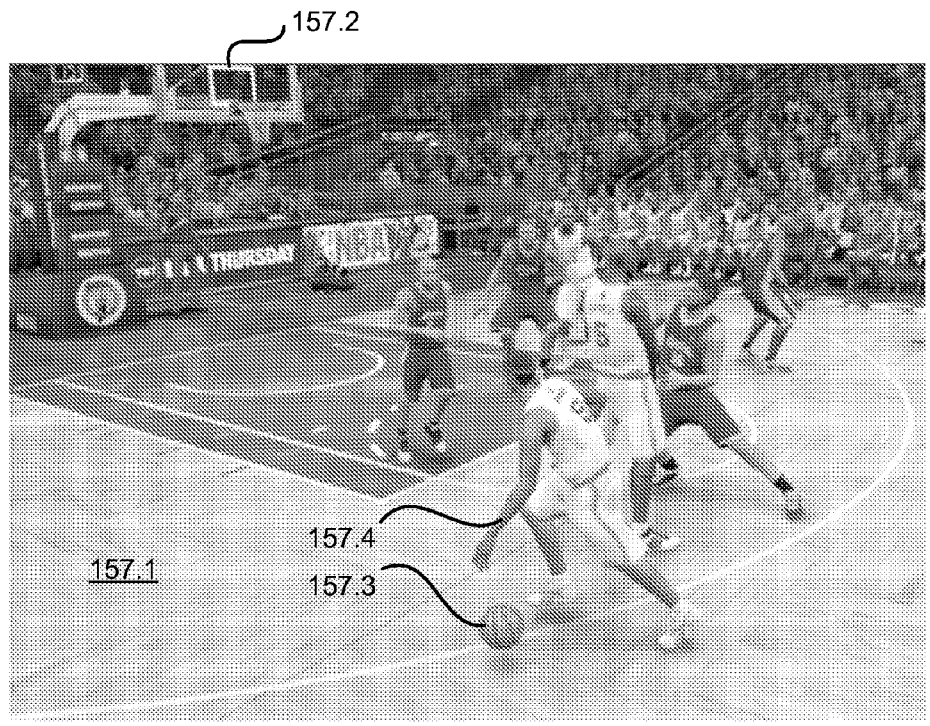

FIG. 7H illustrates a scene from a basketball simulation game, in accordance with an embodiment of the invention. As shown, elements such as the court floor 157.1 and the basketball hoop 157.2 can be determined to be proximate as they relate to the structure of the basketball playing arena. Additionally, various types of animation should match each other, such as the movement of a player 157.4 when dribbling the ball 157.3. Systems in accordance with embodiments of the invention can enable owners of these various content assets to develop the assets in a socially interactive manner.

Figure 7I:
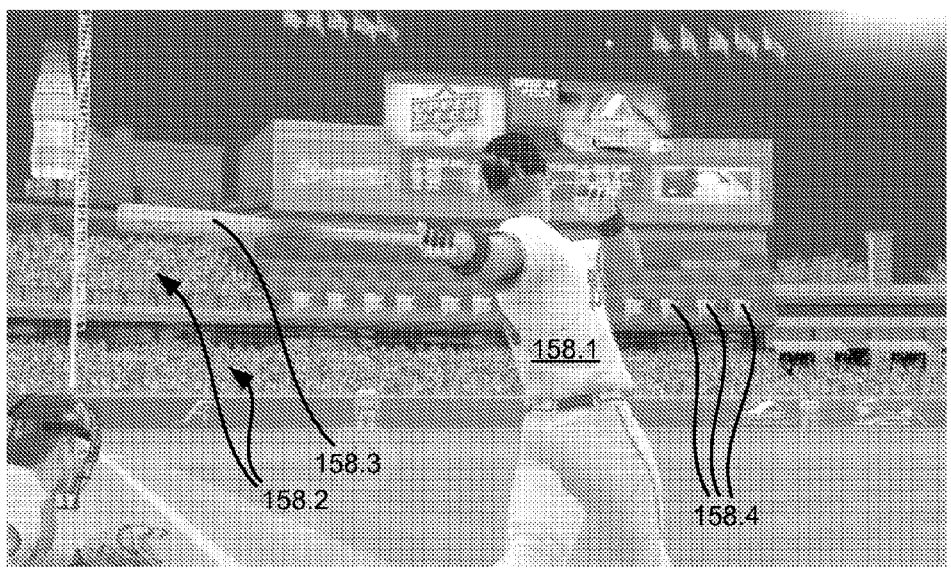

FIG. 7I illustrates a scene from a baseball video game, in accordance with an embodiment of the invention. As shown, a player 158.1 swings a bat 158.3. In the stadium there are various fans 158.2. The fans 158.2 may include several different types of individual persons. Also, the stadium includes other items such as flags 158.4. These various assets can be determined to be proximate to each other in various ways. For example, the bat 158.3 should fit the player 158.1. And the flags 158.4 should be appropriate to the stadium. Systems in accordance with embodiments of the invention can enable owners of these various content assets to develop the assets in a socially interactive manner.

Figure 7J:
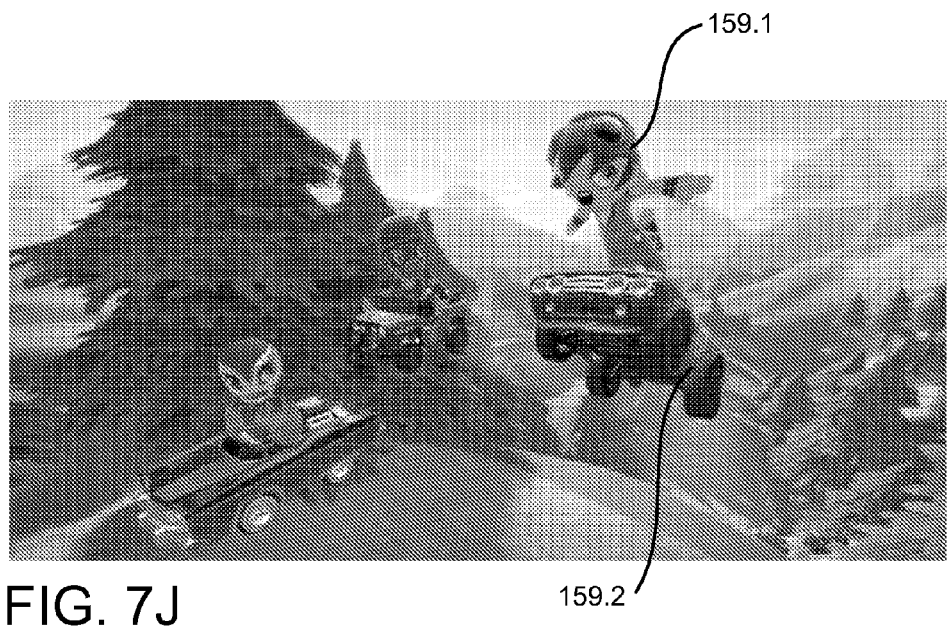

FIG. 7J illustrates a scene from a kart racing game, in accordance with an embodiment of the invention. As shown, a character 159.1 drives a car 159.2. The character 159.1 and the car 159.2 must be designed to be compatible with each other. Thus, a expert system may determine them to be proximate content assets.

Figure 7K:
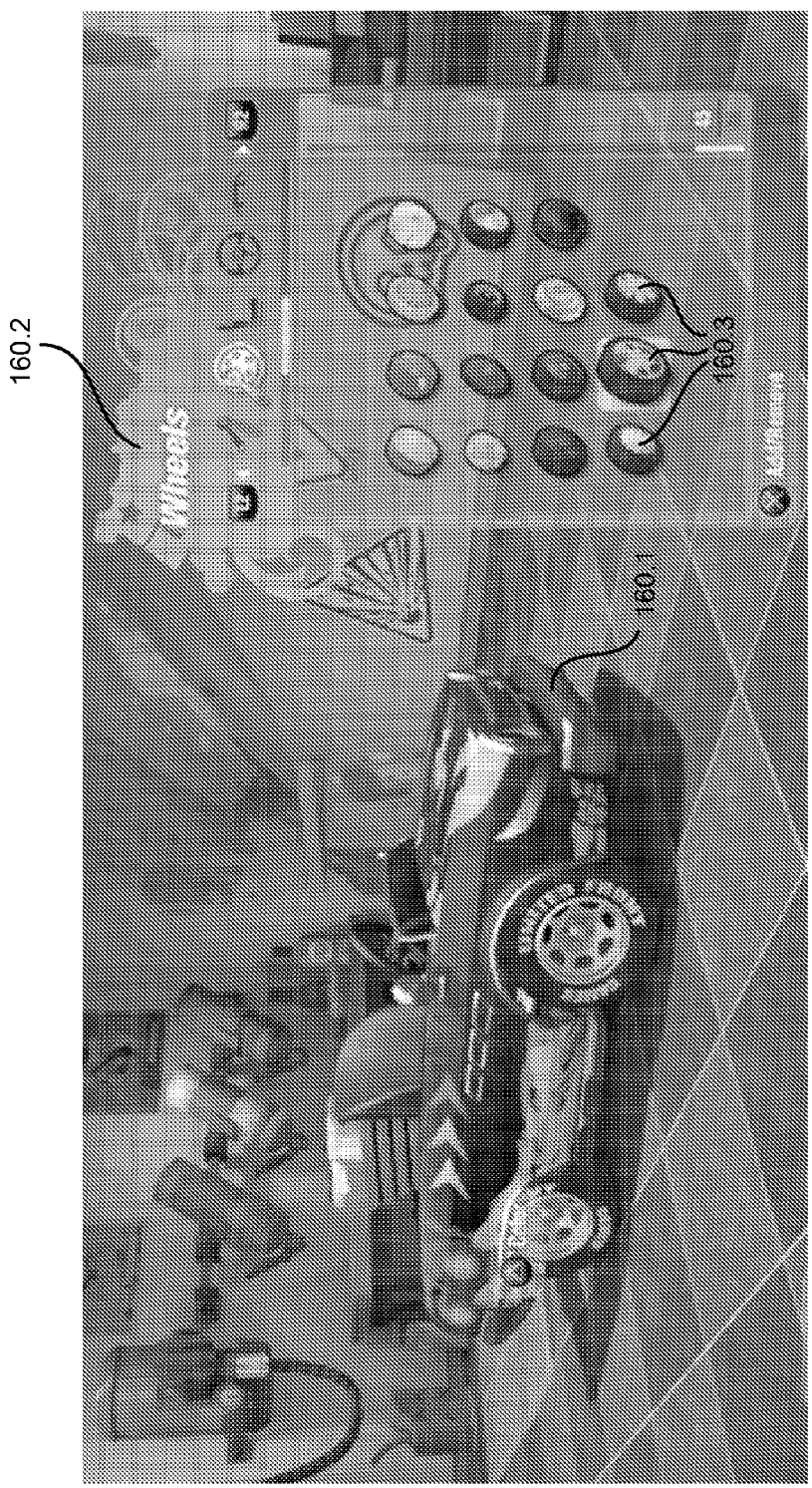

FIG. 7K illustrates a customization scene from a racing game, in accordance with an embodiment of the invention. A car 160.1 is shown, with a menu 160.2 for customizing the wheels of the car 160.1. The menu should be shown in such a manner so as not to obscure any important items in the customization scene. Furthermore, the wheels 160.3 should be compatible with the car 160.1. As such, the items shown in the customization scene may be determined to be proximate to each other.

Figure 8:
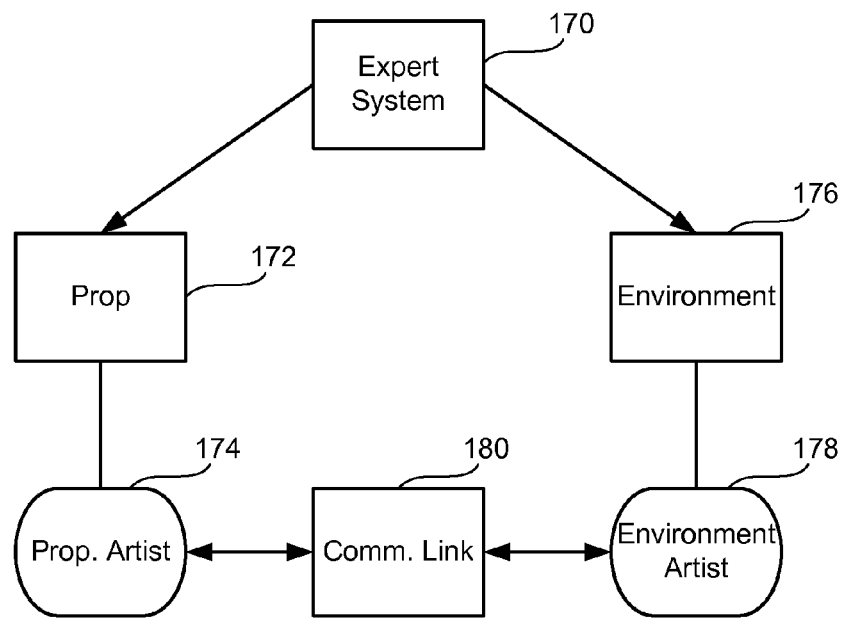
FIG. 8 illustrates an example of social interactive content development amongst artists working on proximate assets, in accordance with an embodiment of the invention.

FIG. 8 illustrates an example of social interactive content development amongst artists working on proximate assets, in accordance with an embodiment of the invention. As shown, an expert system 170 determines that a prop 172 and an environment 176 are proximate assets. An expert system may include any of the components of the systems described with reference to FIGS. 1 and 2. The expert system determines proximate assets, and triggers social interactions between persons working on proximate assets. In the illustrated embodiment, a prop artist 174 edits prop 172 while an environment artist edits environment 176. The expert system 170 detects that the prop artist 174 and the environment artist 178 are working on related assets, and informs one or both of them of this scenario. The expert system may provide a mechanism for initiating social interaction between the prop artist 174 and the environment artist 178, such as via communication link 180, which may include any of various types of communication methods.

Figure 9:
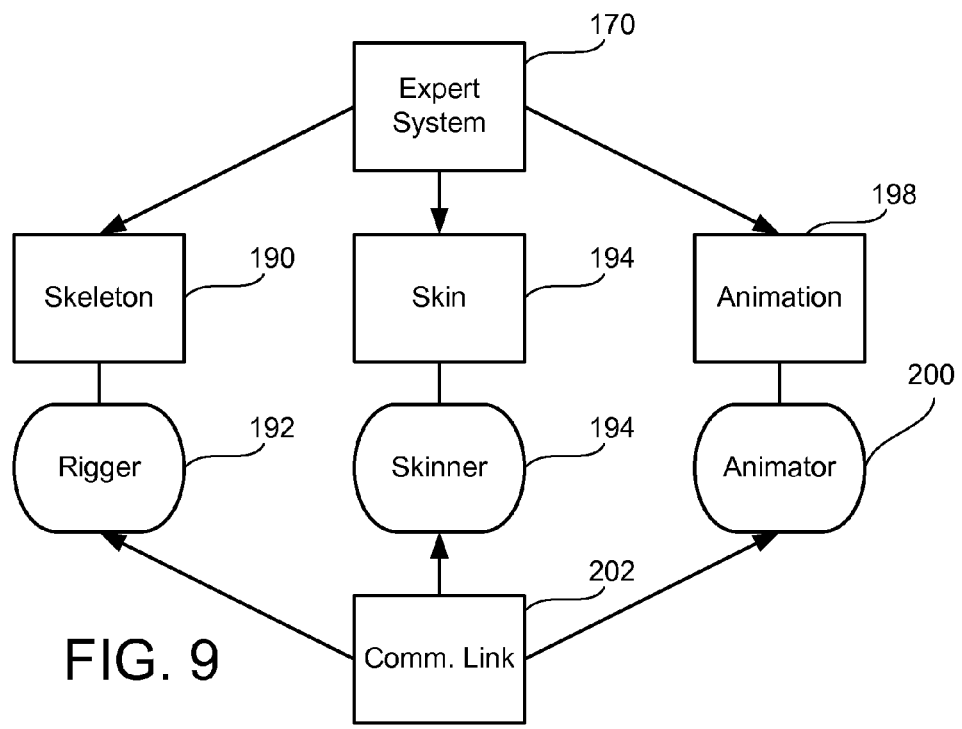
FIG. 9 illustrates an example of social interactive content development amongst artists working on proximate assets, in accordance with an embodiment of the invention.

FIG. 9 illustrates an example of social interactive content development amongst artists working on proximate assets, in accordance with an embodiment of the invention. The expert system 170 determines that a skeleton 190, a skin 194, and an animation 198 are proximate to each other as they relate to the same skeletal animation. A skeletal animation will be generally understood as a computer animation technique in which a three-dimensional object is defined by a skeleton (or rig) and a surface representation known as a skin or mesh. The skeleton is generally manipulated, such as by posing or key-framing, so as to animate the skin, thereby controlling the movement and deformation of the object. In the illustrated embodiment, a rigger 192 edits the skeleton 190, while a skinner 196 edits the skin 194, and an animator 200 edits the animation 198. When the expert system 170 detects that one or more of the rigger 192, skinner 196, and animator 200 are performing changes that may affect one or more of the others' portions of the skeletal animation, then the expert system may notify the involved parties and facilitate communication between them. In one embodiment, a communication link 202 is established amongst the rigger 192, skinner 196, and animator 200.

Figure 10:
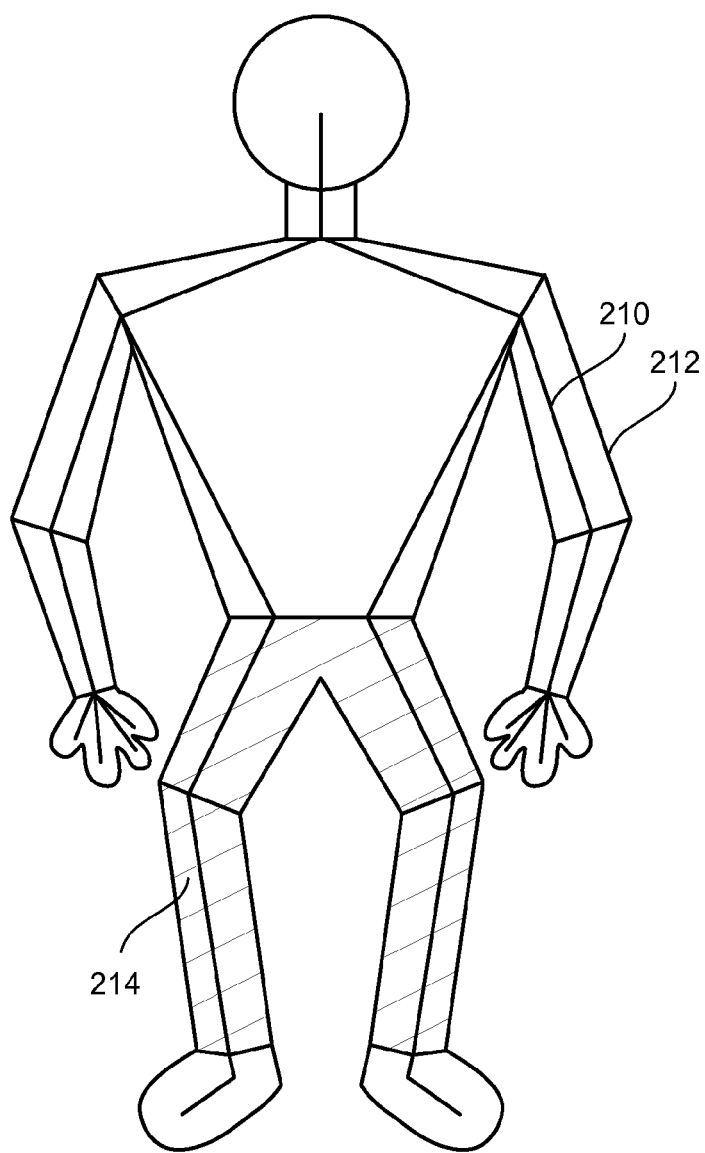
FIG. 10 illustrates various content assets which together form a humanoid figure, in accordance with an embodiment of the invention.

FIG. 10 illustrates various content assets which together form a humanoid figure, in accordance with an embodiment of the invention. A wireframe structure 210 determines the pivot points and overall structure of the humanoid figure.

Overlaid on the wireframe structure is a skin 212. Overlaid on the skin 212 are various textures and shading, such as texture 214. The wireframe structure 210, skin 212, and textures 214 are proximate assets as they relate to the same humanoid figure. In an embodiment of the invention, a system is capable of recognizing the proximity of these art assets and initiating and facilitating social interaction amongst the respective personnel working on them.

Figure 11:
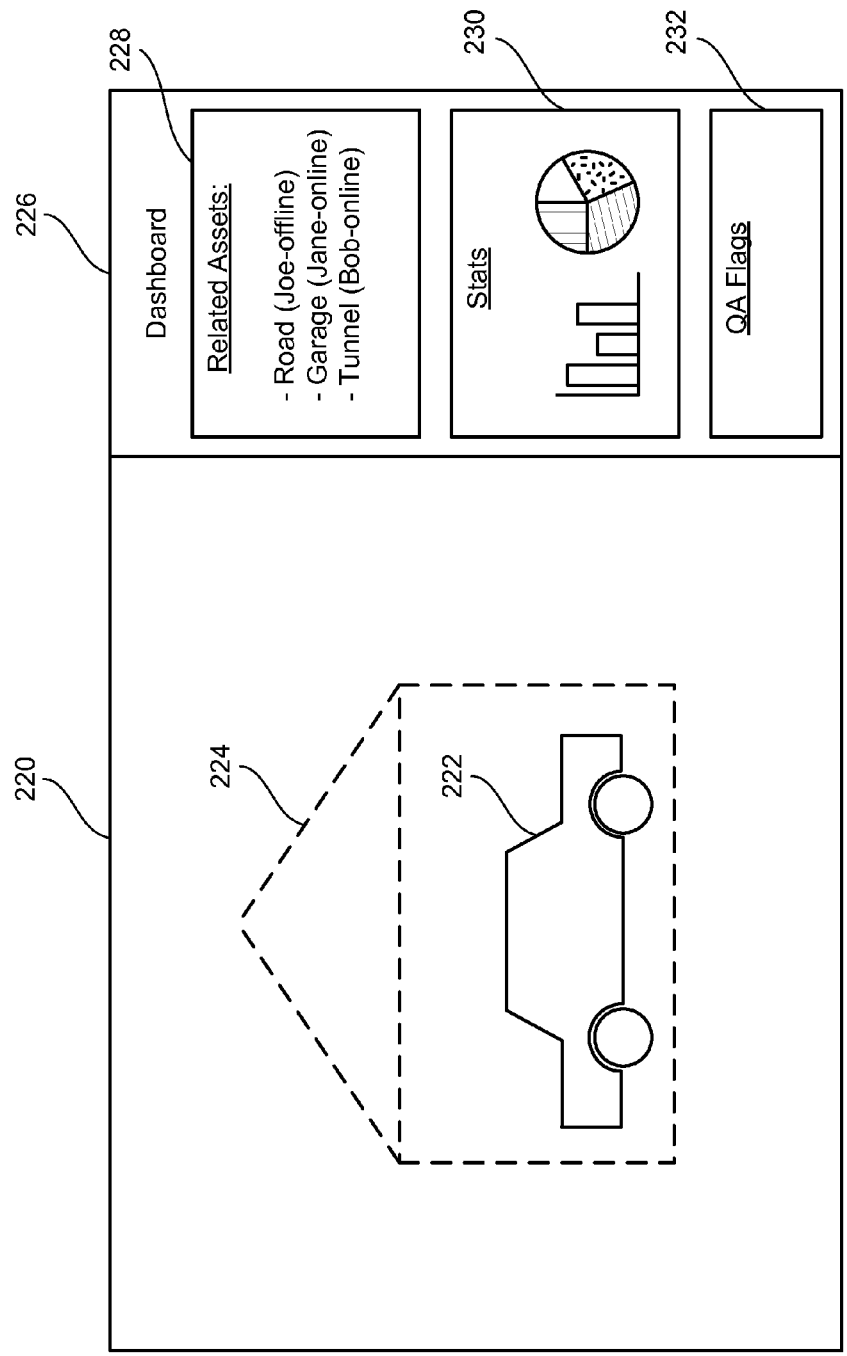
FIG. 11 illustrates an editor window for editing an asset, in accordance with an embodiment of the invention.

FIG. 11 illustrates an editor window for editing an asset, in accordance with an embodiment of the invention. The editor window includes an asset editing portion 220 for editing a content asset. In the illustrated embodiment, a content asset 222 is currently being edited. The editor window also includes a dashboard 226 for displaying information related to the content asset 222 that is being edited. The dashboard 226 includes a related assets viewer 228 for displaying information about content assets which are proximate to the content asset that is currently being edited in the asset editing portion 220. As shown, in one embodiment the related assets viewer 228 shows proximate assets, their owners, and their current online/offline status. In one embodiment, a mechanism is provided for initiating communication with one or more of the owners of the proximate assets, such as by clicking on their name if they are currently online. Additionally, an overlay feature enables proximate assets to be overlaid or shown alongside the content asset currently being edited, so that an editor may view a content asset with additional context. In the illustrated embodiment for example, the content asset 222 is an automobile, and a garage asset has been selected in the related assets viewer 228, causing the garage asset 224 to be overlaid on the content asset 222.

The dashboard further includes an asset statistics viewer 230 for displaying various information or statistics about the content asset currently being edited. For example, asset statistics viewer 230 may display information about the prevalence of the content asset 222 throughout the larger interactive application, cost or revenue information, etc. The dashboard 226 also includes a QA flag viewer 232 for displaying information about QA flags related to the content asset being currently edited.

Figure 12:
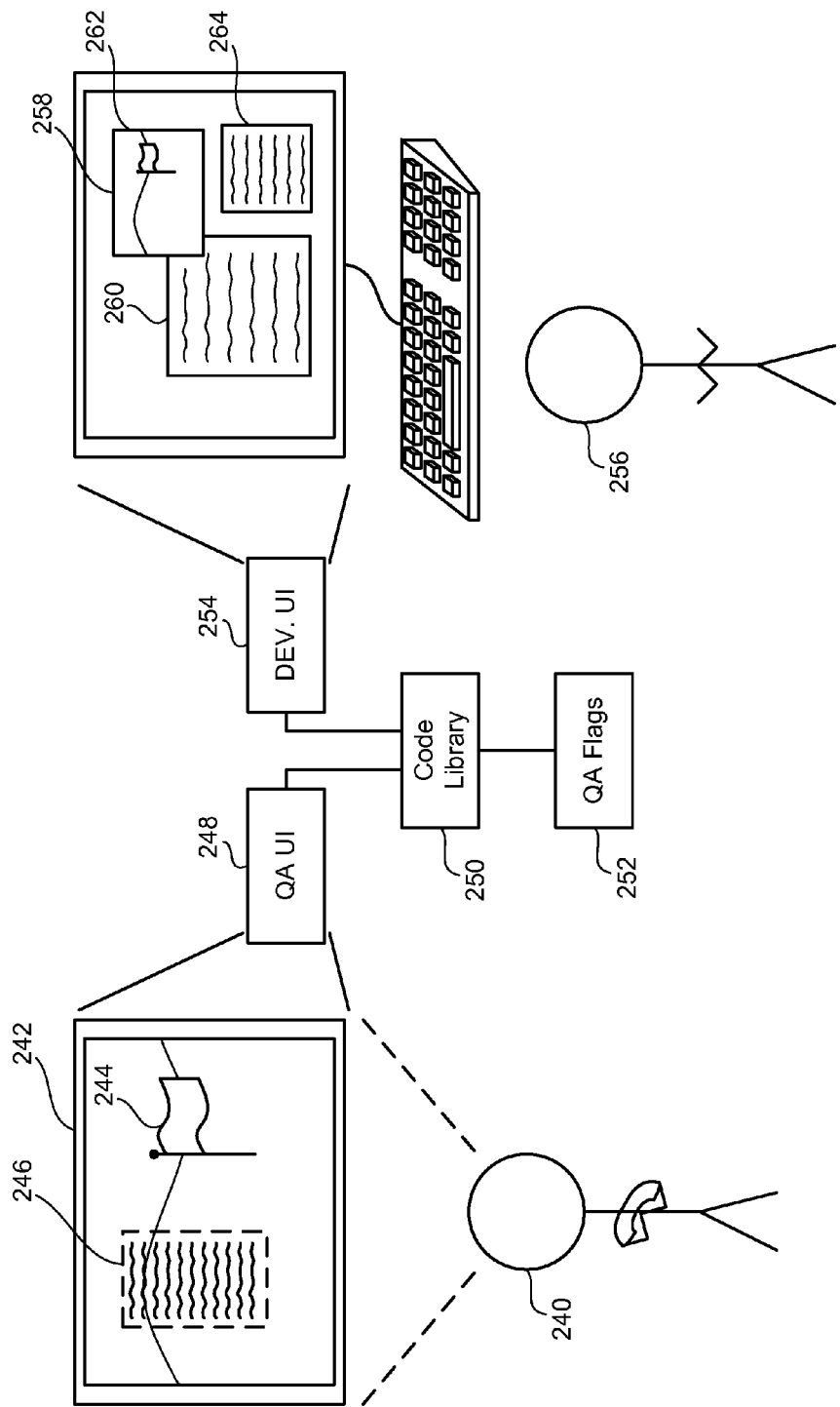
FIG. 12 illustrates the placement and review of a QA flag, in accordance with an embodiment of the invention.

FIG. 12 illustrates the placement and review of a QA flag, in accordance with an embodiment of the invention. As shown, a QA tester 240 is testing a virtual environment as defined various content assets of an asset library 250. For example, in one embodiment, the content assets define a video game, and the QA tester 240 tests the virtual environment of the video game by playing through the video game. The QA tester utilizes a QA user interface 248, which produces the display screen 242 that is viewed by the QA tester 240. As shown on the display screen 242, the QA tester 240 has placed a virtual QA flag 244 at a specific location (both geographically and temporally) within the virtual environment of the video game. The QA flag 244 is placed to indicate the presence of an issue or bug that requires review by a developer or editor. Additionally, the QA tester 240 has entered descriptive information about the issue in a text window 246 for review by the developer. The QA flag and associated descriptive information are stored by a QA flags module 252 and associated with one or more of the content assets of the asset library 250.

An editor 256 is an owner or developer of a specific content asset for which the QA flag 244 is associated, and therefore notified of the QA flag. The editor 256 accesses the specific content asset and reviews the QA flag via an editor user interface 254. The editor user interface 254 is rendered as display screen 258, including an editing window 260 for editing the specific content asset. Additionally, a screenshot or video clip 262 shows the rendered virtual environment in which the QA flag 244 was placed by the QA tester 240. Also, a window 264 displays information about the QA flag 224, such as the descriptive information entered by the QA tester 240. In one embodiment, the information includes the id and online status of the QA tester 240 who set the QA flag 244. The editor 256 may be presented with options to initiate communication with the QA tester 220, such as via e-mail or a real-time chat. In this way, the editor 256 is timely informed of QA issues and able to effectively address them in a social interactive manner.

Figure 13:
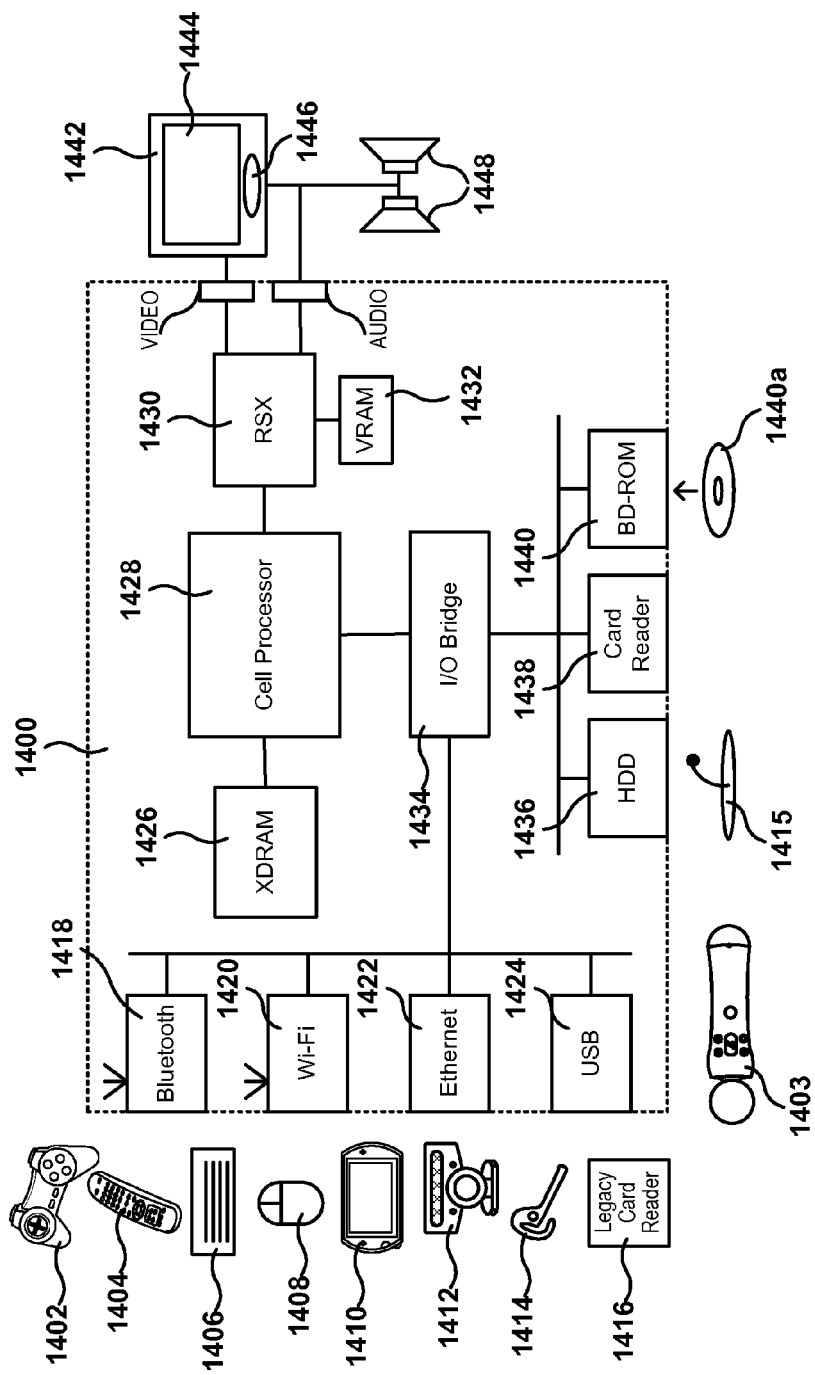
FIG. 13 illustrates hardware and user interfaces that may be used to implement embodiments of the invention.

FIG. 13 illustrates hardware and user interfaces that may be used to implement embodiments of the invention. FIG. 13 schematically illustrates the overall system architecture of the Sony® Playstation 3® entertainment device. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony PSP® entertainment device; a video camera such as a PlayStation®Eye Camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1416 may be connected to the system unit via a USB port 1424, enabling the reading of memory cards of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, an imperfect sphere, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit (RSX) 1430, through audio and video connectors to a display and sound output device 1442 such as a monitor or television set having a display 1444 and one or more loudspeakers 1446, or stand-alone speakers 1448. In one embodiment, voice and gaze inputs are utilized to play sound toward specific audio speakers according to the POG of the user. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single Charge Coupled Device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for social interactive content development of a plurality of art assets for an interactive video game, comprising:
    a proximity analyzer for determining proximity relationships amongst the plurality of art assets, each of the art assets being defined for display during execution of the interactive video game;
    an activity monitor for monitoring access to the plurality of art assets;
    a social inference engine for initiating a communication in response to triggering a predefined access threshold set for a specific art asset based on a proximity relationship of the specific art asset to a proximate art asset.

2. The system of claim 1, wherein at least one of the plurality of art assets defines a volumetric region in a virtual environment of the interactive video game.

3. The system of claim 1, wherein at least one of the plurality of art assets is defined by a skeletal animation.

4. The system of claim 1, wherein the predefined access threshold is selected from the group consisting of opening, viewing, or editing the specific art asset.

5. The system of claim 1, wherein the communication is directed to one or more of a user triggering the predefined access threshold set for the specific content asset and a user triggering a predefined access threshold set for the proximate content asset.

6. The system of claim 1, wherein the communication comprises a real-time communication link, the real-time communication link defined between a user triggering the predefined access threshold set for the specific content asset and a user triggering a predefined access threshold set for the proximate content asset.

7. The system of claim 6, wherein the real-time communication link includes one of a live view and a history view of the specific content asset or the proximate content asset.

8. The system of claim 1, wherein the proximity analyzer determines proximity relationships amongst the plurality of content assets by analyzing one or more of the following:
    relatedness of two or more of the plurality of content assets to a same object;
    one or more of parent, child, or peer relationships amongst two or more of the plurality of content assets;
    geographical proximity of two or more of the plurality of content assets when in use by the interactive application; or
    temporal proximity of two or more of the plurality of content assets when in use by the interactive application.

9. The system of claim 1, further comprising a user interface having a value data presenter for presenting value data regarding one or more of the plurality of content assets, the value data defining a relative level of importance, wherein the value data includes metrics derived from one or more of development time, play time, test time, cost, and revenue.

10. The system of claim 1, further comprising a user interface having an overlay presenter for displaying proximate art assets overlaid upon each other.

11. A system for performing quality assurance (QA) of a plurality of content assets for an interactive application, further comprising,
    an execution module for executing the interactive application for QA testing;
    a flag generator for generating a flag during the execution of the interactive application, the flag identifying a QA issue, the flag defined for a location within a virtual environment rendered during the execution of the interactive application;
    a social feedback engine for initiating a communication to an owner of a specific content asset proximate to the flag, the specific content asset being defined within the virtual environment during the execution at a location proximate to the location of the flag, the communication identifying the flag.

12. The system of claim 11, wherein the flag is associated with the specific content asset.

13. The system of claim 11, further comprising,
    a capture module for capturing one or more of an image or video from the execution of the interactive application in which the flag is defined.

14. The system of claim 11, wherein the flag identifies a QA tester, and wherein the communication includes a link to initiate a real-time communication between the owner of the specific content asset and the QA tester.

15. The system of claim 11, wherein the flag generator provides a user interface for defining attributes of the flag.

16. A processor-implemented method for social interactive content development of a plurality of art assets for an interactive video game, comprising:
    determining proximity relationships amongst the plurality of art assets, each of the art assets being defined for display during execution of the interactive video game;
    monitoring access to the plurality of art assets;
    initiating a communication in response to triggering a predefined access threshold set for a specific art asset based on a proximity relationship of the specific art asset to a proximate art asset;
    wherein the method is executed by a processor.

17. The method of claim 16, wherein at least one of the plurality of art assets defines a volumetric region in a virtual environment of the interactive video game.

18. The method of claim 16, wherein at least one of the plurality of art assets is defined by a skeletal animation.

19. The method of claim 16, wherein the predefined access threshold is selected from the group consisting of opening, viewing, or editing the specific art asset.

20. The method of claim 16, wherein the communication is directed to one or more of a user triggering the predefined access threshold set for the specific content asset and a user triggering a predefined access threshold set for the proximate content asset.

21. The method of claim 16, wherein the communication comprises a real-time communication link, the real-time communication link defined between a user triggering the predefined access threshold set for the specific content asset and a user triggering a predefined access threshold set for the proximate content asset.

22. The method of claim 21, wherein the real-time communication link includes one of a live view and a history view of the specific content asset or the proximate content asset.

23. The method of claim 16, wherein the determining proximity relationships amongst the plurality of content assets includes analyzing one or more of the following:
- relatedness of two or more of the plurality of content assets to a same object;
- one or more of parent, child, or peer relationships amongst two or more of the plurality of content assets;
- geographical proximity of two or more of the plurality of content assets when in use by the interactive application; or
- temporal proximity of two or more of the plurality of content assets when in use by the interactive application.

24. The method of claim 16, further comprising presenting value data regarding one or more of the plurality of content assets, the value data defining a relative level of importance, wherein the value data includes metrics derived from one or more of development time, play time, test time, cost, and revenue.

25. The method of claim 16, further comprising displaying proximate art assets overlaid upon each other.

26. A processor-implemented method for performing quality assurance (QA) of a plurality of content assets for an interactive application, further comprising,
- executing the interactive application for QA testing;
- generating a flag during the execution of the interactive application, the flag identifying a QA issue, the flag defined for a location within a virtual environment rendered during the execution of the interactive application;
- initiating a communication to an owner of a specific content asset proximate to the flag, the specific content asset being defined within the virtual environment during the execution at a location proximate to the location of the flag, the communication identifying the flag;
- wherein the method is executed by a processor.

27. The method of claim 26, wherein the flag is associated with the specific content asset.

28. The method of claim 26, further comprising,
- capturing one or more of an image or video from the execution of the interactive application in which the flag is defined.

29. The method of claim 26, wherein the flag identifies a QA tester, and wherein the communication includes a link to initiate a real-time communication between the owner of the specific content asset and the QA tester.

30. The method of claim 26, wherein generating the flag generator includes providing a user interface for defining attributes of the flag.

* * * * *